US000001091H

United States Statutory Invention Registration [19]

[11] Reg. Number: H1091

[43] Published: Aug. 4, 1992

Takamuki et al.

[54] LIGHT-SENSITIVE SILVER HALIDE PHOTOGRAPHIC MATERIAL

[75] Inventors: Yasuhiko Takamuki; Junichi Fukawa; Takeshi Habu, all of Hino, Japan

[73] Assignee: Konica Corporation, Tokyo, Japan

[21] Appl. No.: 623,257

[22] Filed: Dec. 5, 1990

Related U.S. Application Data

[63] Continuation of Ser. No. 388,639, Aug. 2, 1989, abandoned.

[30] Foreign Application Priority Data

Aug. 9, 1988 [JP] Japan ..... 63-199083
Aug. 12, 1988 [JP] Japan ..... 63-202271

[51] Int. Cl.[5] ..... G03C 1/06
[52] U.S. Cl. ..... 430/264; 430/607; 430/611; 430/614; 430/609; 430/613; 430/551
[58] Field of Search ..... 430/264, 607, 611, 614, 430/609, 613, 551

[56] References Cited

U.S. PATENT DOCUMENTS 3,619,198 9/1971 Yamamoto et al. .
3,625,697 12/1971 Sato et al. .
3,650,759 3/1972 Sonoda et al. .
4,268,621 5/1981 Ogi et al. ..... 430/409
4,686,167 8/1987 Resnick et al. ..... 430/264
4,816,373 5/1989 Ohashi et al. ..... 430/264
4,839,258 6/1989 Katoh ..... 430/264
4,912,017 5/1990 Takagi et al. ..... 430/264
4,971,888 11/1990 Okada et al. ..... 430/264

FOREIGN PATENT DOCUMENTS 2422772 1/1975 Fed. Rep. of Germany ..... 430/602
61-047945 3/1986 Japan .
62-262040 11/1987 Japan ..... 430/603
63-046442 2/1988 Japan .

OTHER PUBLICATIONS

Hackh's Chemical Dictionary, Ed. J. Grant; 1969 McGraw Hill, p. 62, bottom of right-hand column.

*Primary Examiner*—Robert L. Stoll
*Assistant Examiner*—Joseph D. Anthony
*Attorney, Agent, or Firm*—Finnegan, Henderson, Farabow, Garrett & Dunner

[57] ABSTRACT

There is disclosed a light-sensitive silver halide photographic material which comprises, in a light-sensitive silver halide photographic material provided by coating at least one layer of hydrophilic colloidal layer including light-sensitive silver halide photographic emulsion layer on a support, containing a specific hydrazide derivative in the light-sensitive silver halide emulsion layer and containing, in the hydrophilic colloidal layer, at least one compound selected from each of the groups A and B consisting of the compounds represented by the formulae (II) to (VII) as specified in the specification.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIGHT-SENSITIVE SILVER HALIDE PHOTOGRAPHIC MATERIAL

This application is a continuation of application Ser. No. 07/388,639, filed Aug. 2, 1989, now abandoned.

BACKGROUND OF THE INVENTION

This invention relates to a light-sensitive silver halide photographic material which provides high contrast image, more particularly, to a light-sensitive silver halide photographic material improved in problems in contrast increasing technique caused by using a hydrazide compound.

In recent years, in the fields of printing and photomechanical process, colorination or complication of the printing material has remarkably been progressed. Therefore, demands for improvement in quality and stabilization of quality of a light-sensitive silver halide photographic material for printing (hereinafter referred to as "light-sensitive printing material") which is an intermediate medium of printing have been increased year by year. Heretofore, the general light-sensitive printing material has been provided the so-called "lith-phenomenon" processing suitability in order to accomplish high quality. However, in the "lith phenomenon", it has been well known for a person skilled in the art that it is symstematically impossible to contain high concentration sulfite ion which is a preservative in a developing solution so that stability of the developing solution is remarkably inferior.

As the technique for overcoming unstability of the "lith phenomenon" and obtaining a high contrast image which is the same as the "lith phenomenon", attempts have been done as disclosed in some patent documents. For example, there has been disclosed the technique of obtaining a contrast increased image using hydrazine compounds in Japanese Provisional Patent Publications No. 16623/1978, No. 20921/1978, No. 20922/1978, No. 49429/1978, No. 66731/1978, No. 66732/1978, No. 77616/1978, No. 84714/1978, No. 137133/1978, No. 37732/1979, No. 40629/1979, No. 52050/1980, No. 90940/1980 and No. 67843/1979, etc. In the processing methods of the methods for forming an image using these hydrazide compounds, it is necessary to use a pH value of the developing solution containing the hydrazide compounds or a pH value of the processing developing solution of a light-sensitive photographic material containing the hydrazide compounds which is high to obtain high contrast image, but the technique involves the problem that high pH value decreases effective lifetime of the developing solution.

To the contrary, in Japanese Provisional Patent Publication No. 10644/1981, there is described that by containing a hydrazide compound and a development accelerating amount of an amino compound during image formation, a high contrast image can be formed with a relatively low pH (11 to 11.5).

These image forming methods using the hydrazide compound can obtain extremely high contrast images. In general, unless suitable replenishment of a development replenishing agent is supplied to a photographic processing solution, fog, etc which are not preferred for photographic performances, will be caused. However, in the method of using the hydrazide, even when exhaustion of the photographic processing solution is not so remarkable, at an undeveloped portion, for example, generation of black dots (hereinafter referred to as "pepper fog") such as black sesame between halftone dots during screen photographing using a contrast screen of the light-sensitive printing material can be observed so that it sometimes causes serious defects on commercial values. In the previously mentioned Japanese Provisional Patent Publications No. 16623/1978 and No. 20921/1978, generation of fog including the aforesaid pepper fog is restrained by adding benzotriazole as a restrainer in a silver halide photographic emulsion, but the effect is insufficient and yet high contrast property is sometimes lost, and thus it cannot be said to be a completed technique.

SUMMARY OF THE INVENTION

As the result of earnest studies of the inventors of the present invention, there has been developed a light-sensitive silver halide photographic material which does not impair high contrast while restraining fog including pepper fog which is a defect of the contrast increasing technique using a hydrazide compound.

A first object of the present invention is to provide a light-sensitive silver halide photographic material which can form a high contrast image stably using a hydrazide compound.

A second object of the present invention is to provide a light-sensitive silver halide photographic material which is high contrast without generation of fog including pepper fog.

The above objects of the present invention can be accomplished by the light-sensitive silver halide photographic material which comprises in a light-sensitive silver halide photographic material provided by coating at least one layer of hydrophilic colloidal layer including light-sensitive silver halide photographic emulsion layer on a support, containing a hydrazide derivative in said light-sensitive silver halide emulsion layer and containing, in said hydrophilic colloidal layer, at least one compound selected from the groups A and B consisting of:

(Group A)

the compound represented by the formula (II):

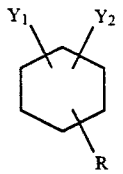

(II)

wherein $Y_1$ and $Y_2$ may be the same or different and each represent —OH group or —$CH_2OH$ group; and R represents an alkyl group having 1 to 3 carbon atoms;

the compound represented by the formula (III):

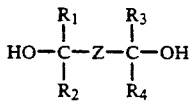

(III)

wherein $R_1$, $R_2$, $R_3$ and $R_4$ may be the same or different and each represent a hydrogen atom or a lower alkyl group, and Z represents —$CH_{2n}$ (where n represents 0 or an integer of 1 to 5),

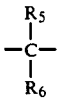

(where $R_5$ and $R_6$ each represent a hydrogen atom, a methyl group, an ethyl group or an isopropyl group provided that the case where both of $R_5$ and $R_6$ are hydrogen atoms is excluded), $—CH_2—O—CH_2—$, $—CH=CH—$, $—C\equiv C—$ or

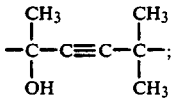

the compound represented by the formula (IV):

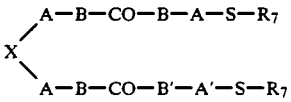

(IV)

wherein A represents a lower alkylene group, $-(CH_2CH_2O)_p-$, $-(CH_2CH_2O)_pCH_2—$ or

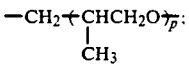

B represents a polyalkylene ether group which does not bond with O; A' represents a lower alkylene group or a polyalkylene ether group represented by the formula: $-(CH_2CH_2O)_pCH_2—CH_2—$ or

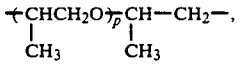

provided that A and A' cannot be the polyalkylene ether groups at the same time, p represents 2 to 30, B and B' each represents —NH— or —O—, but the case where both of B and B' are —O—'s is excluded, $R_7$ represents a lower alkyl group, a phenyl group, an aralkyl group or $-(CH_2)_qCOOR'$ (where R' represents a lower araylkyl group, q represents 1 to 3, and X represents a divalent group represented by —S—, —O—, $—CH_2—$,

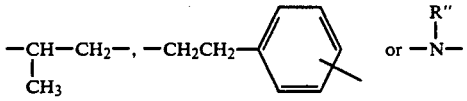

(where R'' represents a lower alkyl group); and the compound represented by the formula (V):

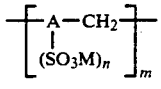

(V)

wherein A represents

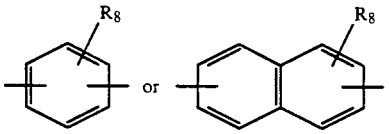

(where $R_8$ represents a hydrogen atom or an alkyl group having 1 to 10 carbon atoms, n represents 1 or 2, and m represents an average degree of polymerization of an integer of 1 to 50, and M represents a hydrogen atom or an alkaline metal atom.

(Group B)

the compound represented by the formula (VI):

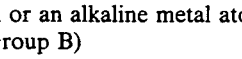

(VI)

wherein $R_{10}$ represents a tetrazaindenyl group or a pentazaindenyl group, n is 1 or 2, and M represents a hydrogen atom or an alkali metal atom (for example, sodium, potassium, etc.);

the compound represented by the formula (VII):

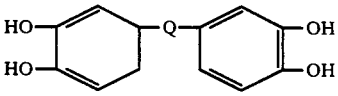

(VII)

wherein Q represents a substituted or unsubstituted straight aliphatic group having a carbon atom of 1 or more which bonds pyrocatechol of both sides, or may be formed a ring by bonding one end of an aliphatic group branched from the straight chain such as siprohydrindene to one end of nucleus of pyrocatechol of both sides; and the compound represented by the formula (VIII):

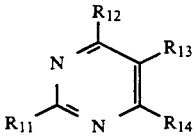

(VIII)

wherein $R_{11}$, $R_{12}$, $R_{13}$ and $R_{14}$ may be the same or different and each represent a hydrogen atom, a halogen atom, a mercapto group, a hydroxy group, an alkyl group, a hydroxyalkyl group, a halogenated alkyl group, an alkoxy group, an alkylthio group, a phenyl group, a benzyl group, an amino group, an alkylamino group or a hydrazino group, provided that at least one of $R_{11}$, $R_{12}$, $R_{13}$ and $R_{14}$ represents a mercapto group.

DESCRIPTION OF THE PREFERRED EMBODIMENTS

In the following, the constitution of the present invention will be described in more detail.

The hydrazide derivatives to be used in the present invention may include the compounds represented by the following formulae (I-a), (I-b) and (I-c).

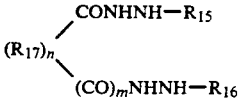

(I-a)

wherein $R_{15}$ and $R_{16}$ each represents an aryl group or a heterocyclic group, $R_{17}$ represents an organic bonding group, n is 0 to 6 and m is 0 or 1, provided that n is 2 or more, and each $R_{17}$ may be the same or different with each other.

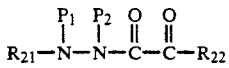

(I-b)

wherein $R_{21}$ represents an aliphatic group, an aromatic group or a heterocyclic group, $R_{22}$ represents a hydrogen atom, an alkoxy group, a heterocyclicoxy group, an amino group or an aryloxy group, each of which may be substituted or unsubstituted, $P_1$ and $P_2$ each represents a hydrogen atom, an acyl group or a sulfinic acid group.

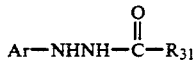

(I-c)

wherein Ar represents an aryl group containing at least one of a ballast group or a silver halide adsorption accelerating group, and $R_{31}$ represents a substituted alkyl group.

In the following, the compounds of the formula (I-a), (I-b) and (I-c) will be described in more detail.

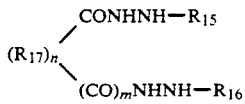

(I-a)

In the formula, $R_{15}$ and $R_{16}$ each represents an aryl group or a heterocyclic group, $R_{17}$ represents an organic bonding group, n is 0 to 6 and m is 0 or 1.

The aryl group represented by $R_{15}$ and $R_{16}$ may include a phenyl group, a naphthyl group, etc., and the heterocyclic group may include a pyridyl group, a benzothiazolyl group, a quinolyl group, a thienyl group, etc., but preferred as $R_{15}$ and $R_{16}$ are an aryl group. To the aryl group or the heterocyclic group represented by $R_{15}$ and $R_{16}$ may be introduced various substituents. Such substituents may include, for example, a halogen atom (e.g. chlorine, fluorine, etc.), an alkyl group (e.g. methyl, ethyl, dodecyl, etc.), an alkoxy group (e.g. methoxy, ethoxy, isopropoxy, butoxy, octyloxy, dodecyloxy, etc.), an acylamino group, (e.g. acetylamino, pivalylamino, benzoylamino, tetradecanoylamino, α-(2,4-di-t-amylphenoxy)-butyrylamino, etc.), amino, etc.), a sulfonylamino group (e.g. methanesulfonylamino, butanesulfonylamino, dodecanesulfonylamino, benzenesulfonylamino, etc.), a urea group (e.g. phenylurea, ethylurea, etc.), a thiourea group (e.g. phenylthiourea, ethylthiourea, etc.), a hydroxy group, an amino group, an alkylamino group (e.g. methylamino, dimethylamino, etc.), a carboxy group, an alkoxycarbonyl group (e.g. ethoxycarbonyl, etc.), a carbamoyl group, a sulfo group, etc. The divalent organic group represented by $R_{17}$ may include, for example, an alkylene group (e.g. methylene, ethylene, trimethylene, tetramethylene, etc.), an arylene group (e.g. phenylene, naphthylene, etc.), an aralkylene group, etc., and the alkylene group may include in the bonding an oxy group, a thio group, a seleno group, a carbonyl group,

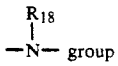

(where $R_{18}$ represents a hydrogen atom, an alkyl group or an aryl group), a sulfonyl group, etc. Various substituents may be introduced in the group represented by $R_{17}$.

Such substituents may include, for example, —CONHNHR$_{19}$ (where $R_{19}$ has the same meaning as defined in the above $R_{15}$ and $R_{16}$), an alkyl group, an alkoxy group, a halogen atom, a hydroxyl group, a carboxy group, an acyl group, an aryl group, etc.

Preferred as $R_{17}$ is an alkylene group.

Among the compounds represented by the formula (I-a), preferred are the compounds wherein $R_{15}$ and $R_{16}$ are substituted or unsubstituted phenyl group, n=m=1 and $R_{17}$ represents an alkylene group.

Representative compounds represented by the above formula (I-a) are shown below.

Specific compounds

I-a-1

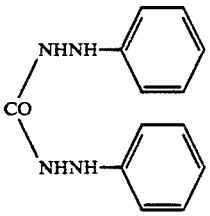

I-a-2

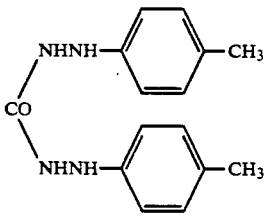

I-a-3

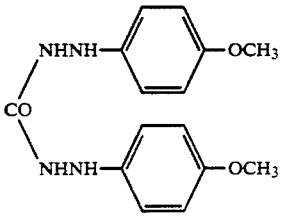

I-a-4

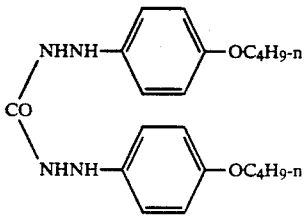

-continued
Specific compounds
I-a-5
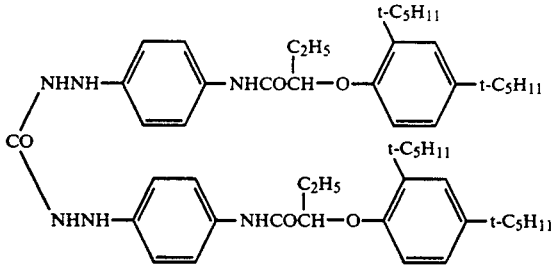
I-a-6
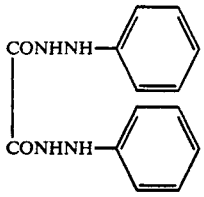
I-a-7
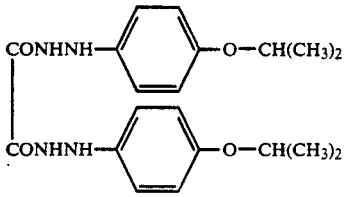
I-a-8
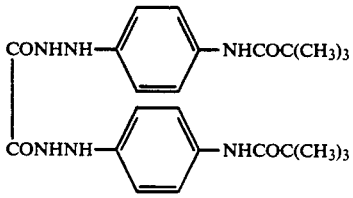
I-a-9
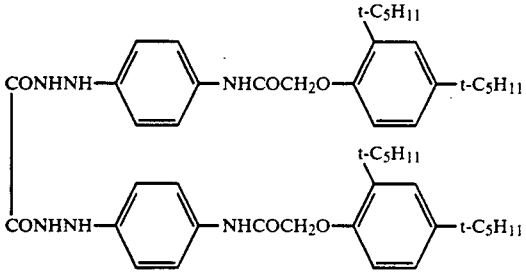
I-a-10
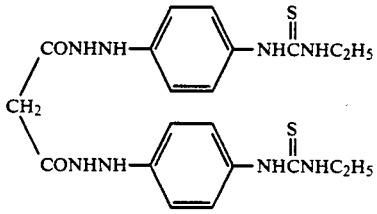
I-a-11
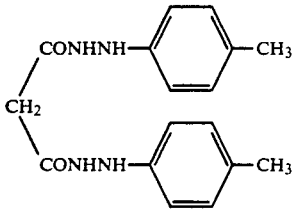
I-a-12
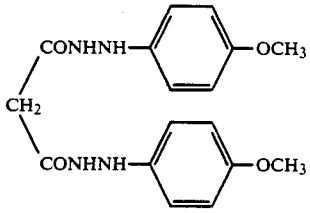
I-a-13
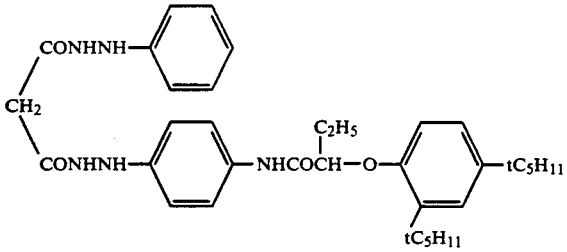
I-a-14
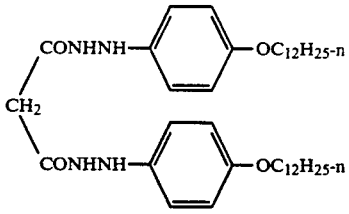
I-a-15
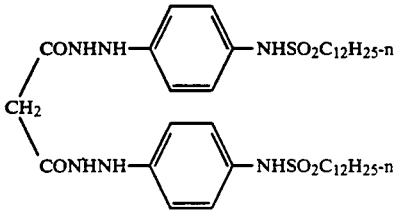
I-a-16
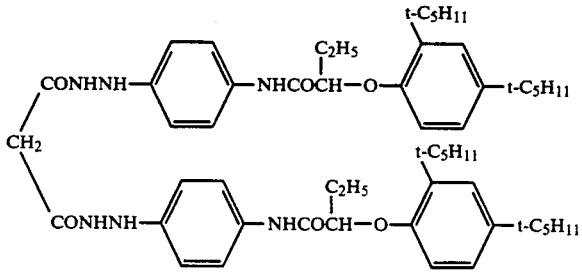

-continued
Specific compounds
I-a-17
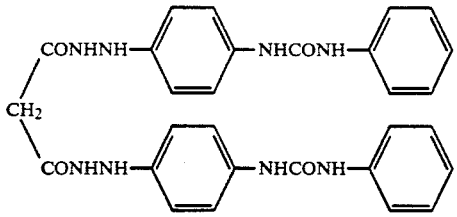
I-a-18
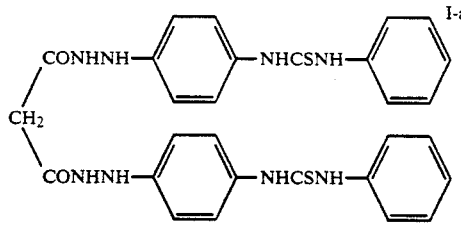
I-a-19
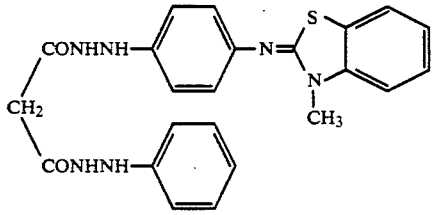
I-a-20
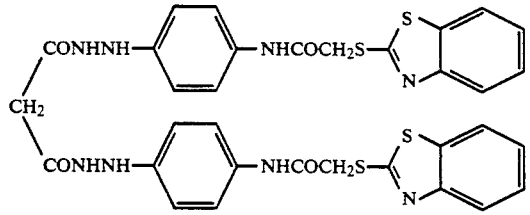
I-a-21
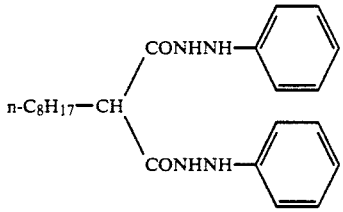
I-a-22
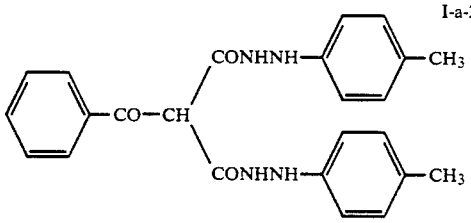
I-a-23
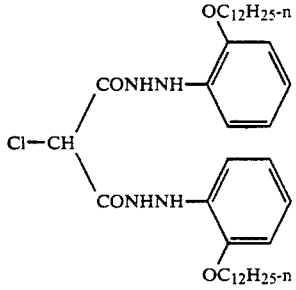
I-a-24
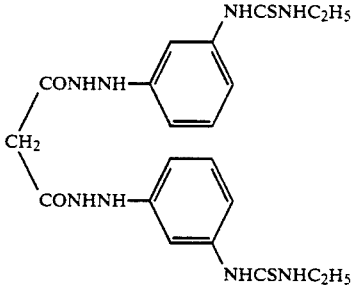
I-a-25
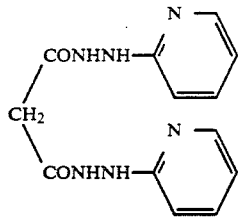
I-a-26
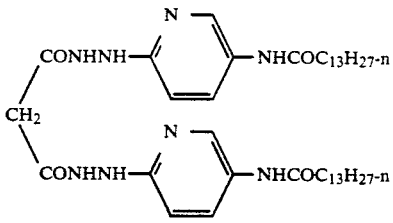
I-a-27
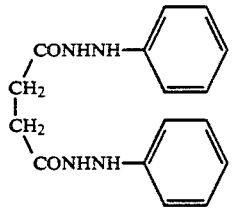
I-a-28
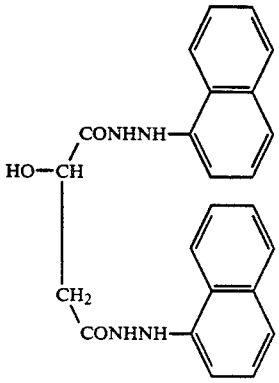

-continued
Specific compounds
I-a-29
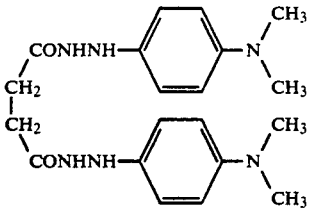
I-a-30
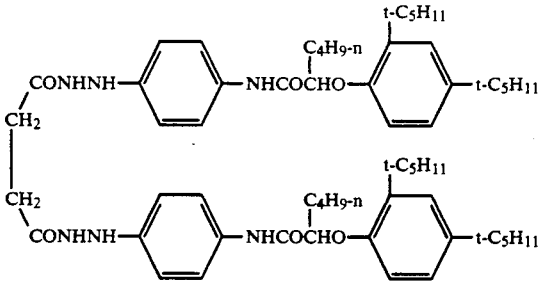
I-a-31
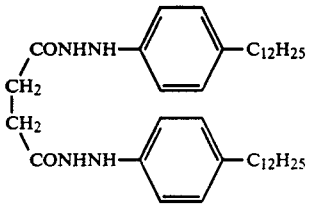
I-a-32
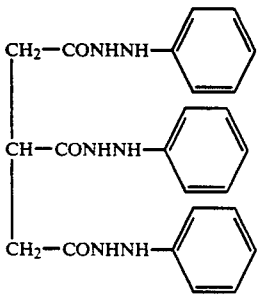
I-a-33
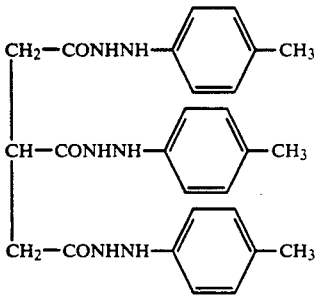
I-a-34
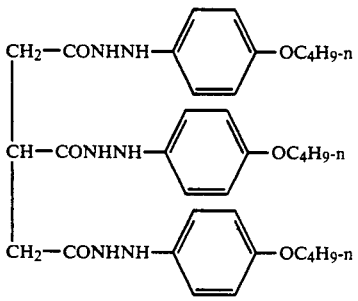
I-a-35
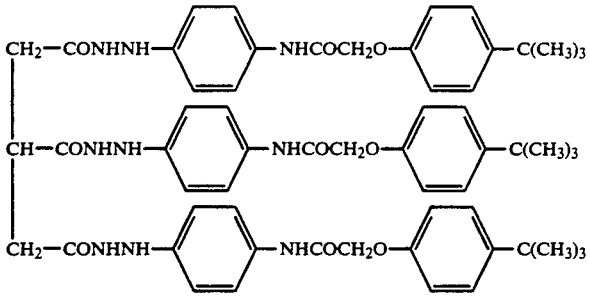
I-a-36
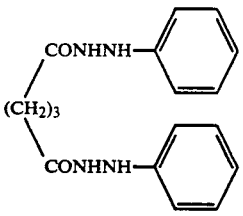
I-a-37
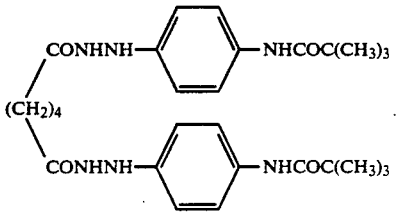
I-a-38
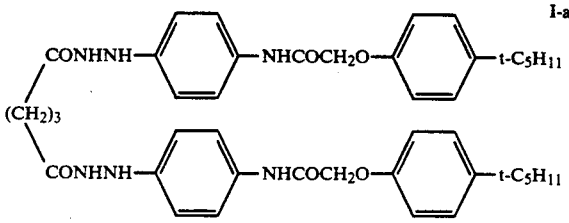

-continued
Specific compounds
I-a-39
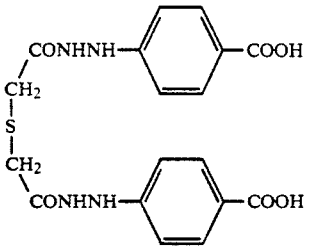
I-a-40
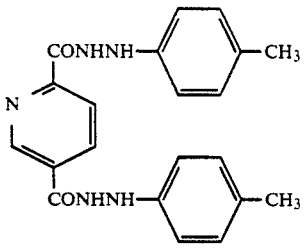
I-a-41
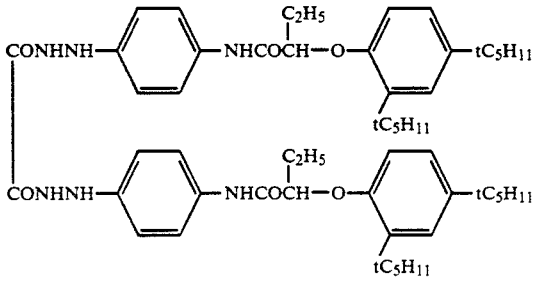
I-a-42
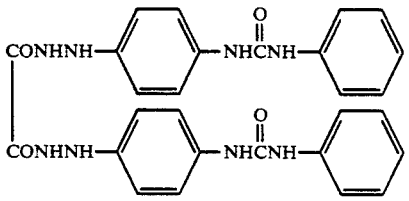
I-a-43
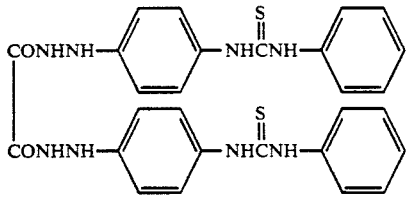
I-a-44
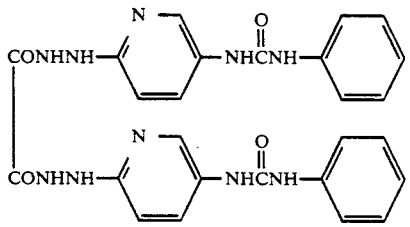
I-a-45
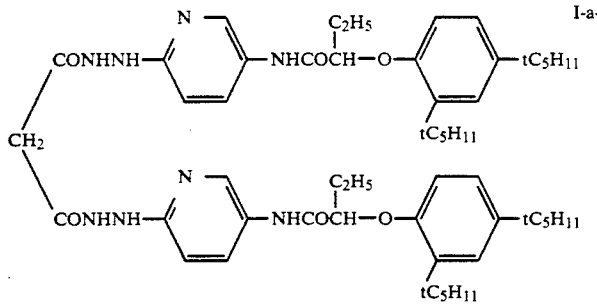
I-a-46
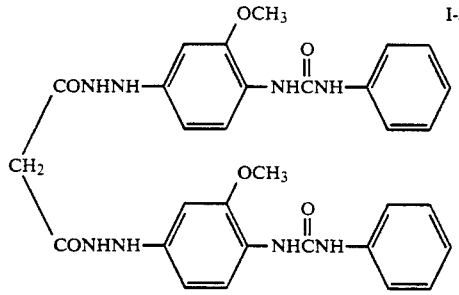
I-a-47
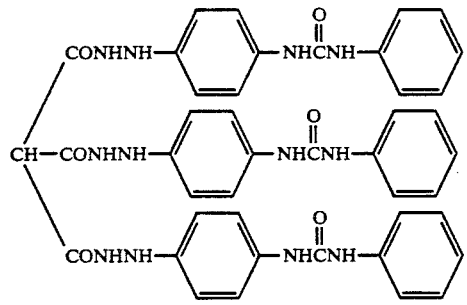
I-a-48
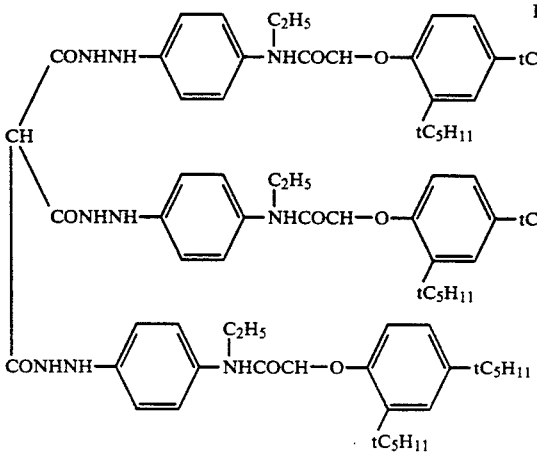

-continued
Specific compounds
I-a-49
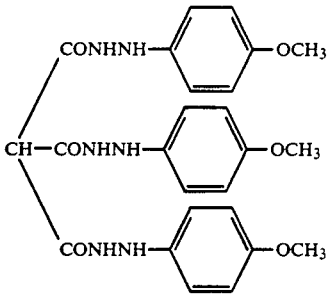
I-a-50
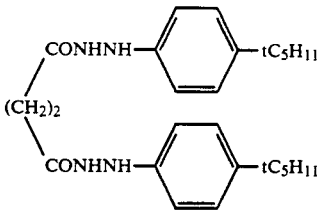
I-a-51
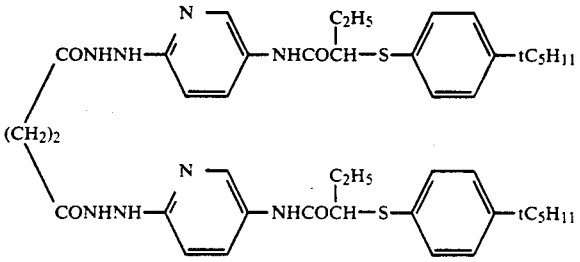
I-a-52
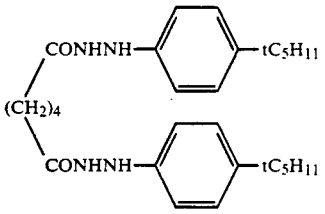
I-a-53
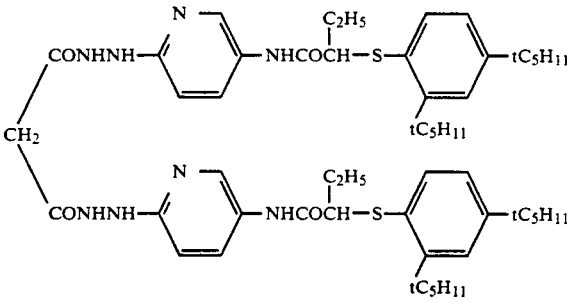
I-a-54
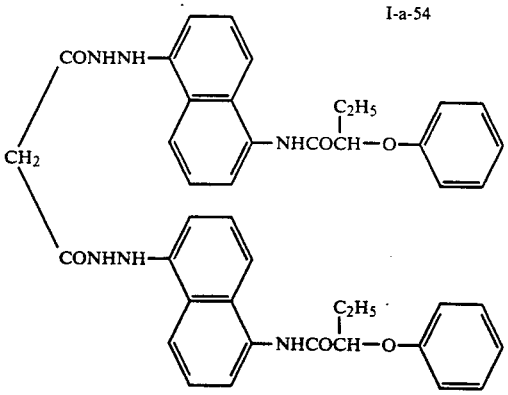
I-a-55
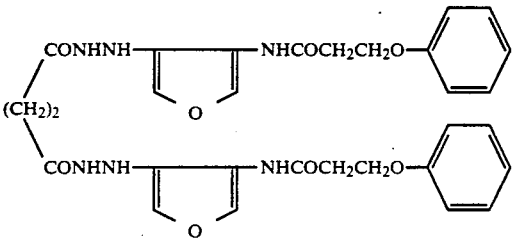
I-a-56
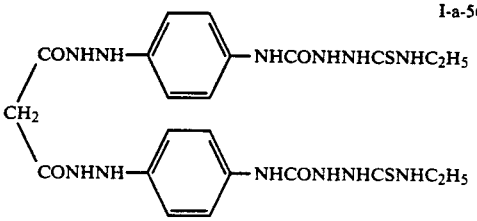

-continued

Specific compounds

I-a-57

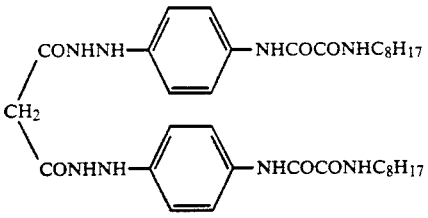

I-a-58

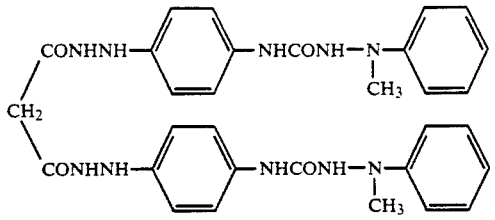

Next, the compound of the formula (I-b) will be explained.

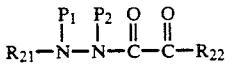

The aliphatic group represented by $R_{21}$ is those having 6 or more of carbon atoms, and particularly preferred is a straight, branched or cyclic alkyl group having 8 to 50 carbon atoms. The branched alkyl group may be cyclized to form a saturated heterocyclic group containing one or more of hetero atoms therein. Also, the alkyl group may have a substituent(s) such as an aryl group, an alkoxy group, a sulfoxy group, etc.

The aromatic group represented by $R_{21}$ is a monocyclic or bicyclic aryl group or a unsaturated heterocyclic group. The unsaturated heterocyclic group may be condensed with a monocyclic or bicyclic aryl group to form a heteroaryl group.

For example, there may be mentioned a benzene ring, a naphthalene ring, a pyridine ring, a pyrimidine ring, an imidazole ring, a pyrazole ring, a quinoline ring, an isoquinoline ring, a benzimidazole ring, a thiazole ring, a benzothiazole ring, etc., but those containing a benzene ring are preferred.

As $R_{21}$, particularly preferred is an aryl group.

The aryl group or the unsaturated heterocyclic group of $R_{21}$ may be substituted, and representative substituents may include a straight, branched or cyclic alkyl group (preferably monocyclic or bicyclic one wherein carbon atoms at the alkyl portion are 1 to 20), an alkoxy group (preferably those having 1 to 20 carbon atoms), a substituted amino group (preferably an amino group substituted by an alkyl group having 1 to 20 carbon atoms), an acylamino group (preferably those having 2 to 30 carbon atoms), a sulfonamide group (preferably those having 1 to 30 carbon atoms), a ureido group (preferably those having 1 to 30 carbon atoms), etc.

Among the groups represented by $R_{22}$ in the formula (I-b), the alkoxy group which may be substituted may be those having 1 to 20 carbon atoms and may be substituted by a halogen atom, an aryl group, etc.

Among the groups represented by $R_{22}$ in the formula (I-b), the aryloxy group or the heterocyclicoxy group, which may be substituted, may preferably be monocyclic one, and also the substituents therefor may include a halogen atom, an alkyl group, an alkoxy group, a cyano group, etc.

Among the groups represented by $R_{22}$, preferred are an alkoxy group or an amino group which may be substituted.

In the case of the amino group, it is

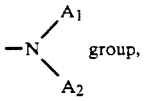

where $A_1$ and $A_2$ each may represent an alkyl group, an alkoxy group, which may be substituted, or a cyclic structure containing —O—, —S— or —N— group bonding. However and the case where $R_{22}$ is a hydrazino group is excluded.

$R_{21}$ or $R_{22}$ in the formula (I-b) may be those having incorporated therein a ballast group which is conventionally used as an immobilizing photographic additive such as a coupler, etc.

The ballast group is a relatively inactive group to photographic property having 8 or more carbon atoms, and it may be selected, for example, from an alkyl group, an alkoxy group, a phenyl group, an alkylphenyl group, a phenoxy group, an alkylphenoxy group, etc.

$R_{21}$ or $R_{22}$ of the formula (I-b) may be those in which a group which enforces adsorption to the surface of a silver halide grain is incorporated therein. Such absorptive groups may include the groups as disclosed in U.S. Pat. No. 4,355,105 such as a thiourea group, a heterocyclic thioamide group, a mercapto heterocyclic group, a triazole group, etc. Among the compounds represented by the formula (I-b), particularly preferred compounds are those represented by the following formula (2-a):

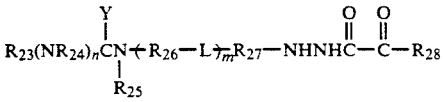

(2-a)

In the above formula (2-a), $R_{23}$ and $R_{24}$ each represents a hydrogen atom, an alkyl group which may be substituted (e.g. a methyl group, an ethyl group, a butyl group, a dodecyl group, a 2-hydroxypropyl group, a 2-cyanoethyl group, a 2-chloroethyl group, etc.), a phenyl group, a naphthyl group, a cyclohexyl group, a pyridyl group, a pyrrolidyl group, each of which may be substituted (e.g. a phenyl group, a p-methylphenyl group, a naphthyl group, an α-hydroxynaphthyl group, a cyclohexyl group, a p-methylcyclohexyl group, a pyridyl group, a 4-propyl-2-pyridyl group, a pyrrolidyl group, a 4-methyl-2-pyrrolidyl group, etc.), $R_{25}$ represents a hydrogen atom, or a benzyl group, an alkoxy group or an alkyl group, each of which may be substituted (e.g. a benzyl group, a p-methylbenzyl group, a methoxy group, an ethoxy group, an ethyl group, a butyl group, etc.), $R_{26}$ and $R_{27}$ each represents a divalent aromatic group (e.g. a phenylene group, a naphthylene group, etc.), Y represents a sulfur atom or an oxygen atom, L represents a divalent bonding group (e.g. $—SO_2CH_2CH_2NH—SO_2NH—$, $—OCH_2SO_2NH—$, —O—, —CH=N—, etc.), $R_{28}$ represents —NR'R" or $—OR_{29}$, wherein R', R" and $R_{29}$ each represents a hydrogen atom, an alkyl group (e.g. a methyl group, an ethyl group, a dodecyl group, etc.), a phenyl group (e.g. a phenyl group, a p-methylphenyl group, a p-methoxyphenyl group, etc.) or a naphthyl group (e.g. an α-naphthyl group, a β-naphthyl group, etc.), each of which may be substituted, and m and n each represent 0 or 1. When $R_{28}$ represents $OR_{28}$, Y is preferably a sulfur atom.

Representative compounds represented by the formulae (I-b) and (2-a) are shown below.

I-b-1

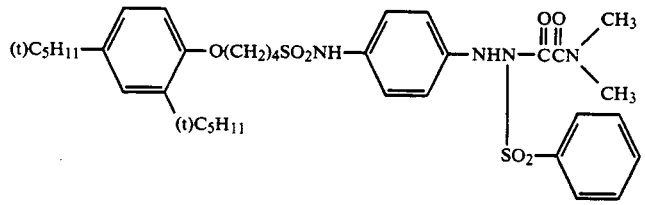

I-b-2

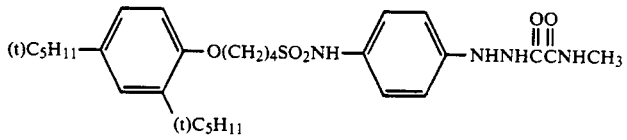

I-b-3

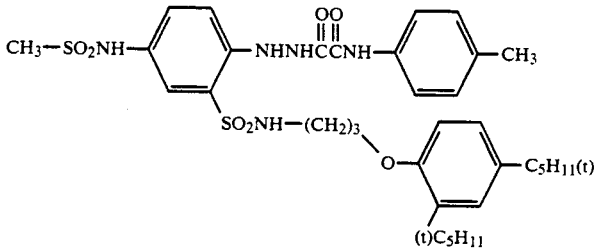

I-b-4

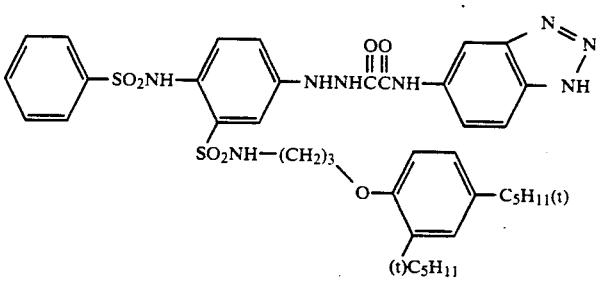

I-b-5

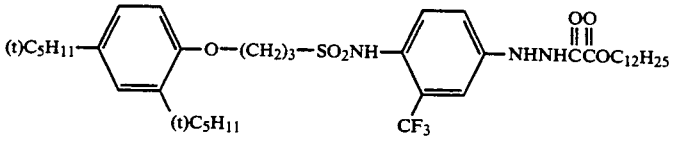

I-b-6

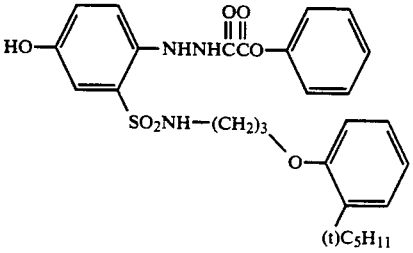

-continued
I-b-7
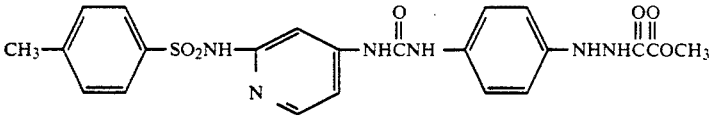
I-b-8
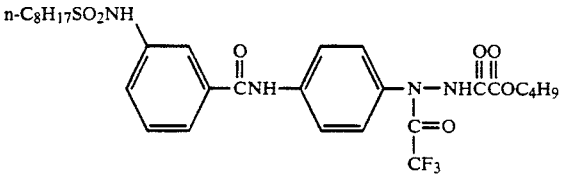
I-b-9
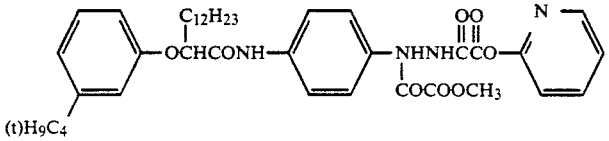
I-b-10
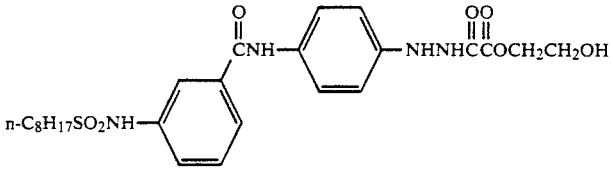
I-b-11
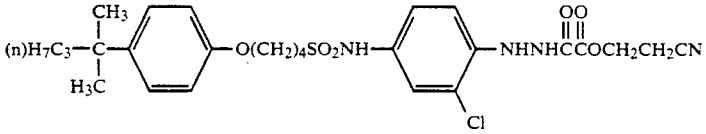
I-b-12
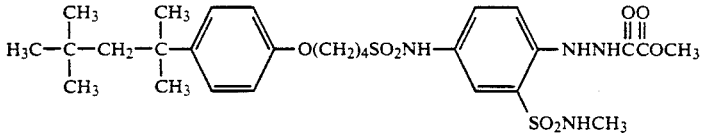
I-b-13
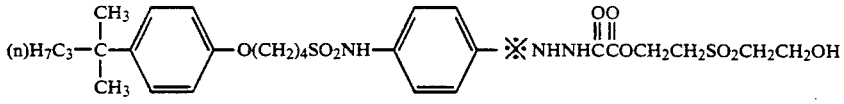
I-b-14
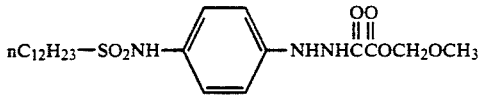
I-b-15
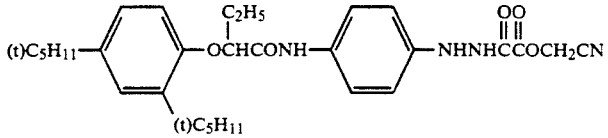
I-b-16

-continued
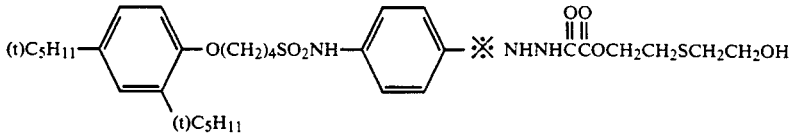
I-b-17
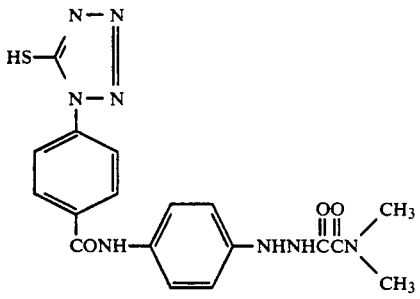
I-b-18
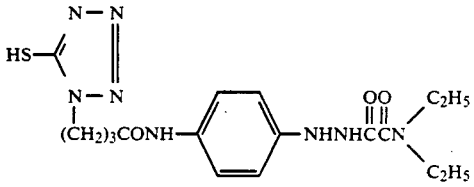
I-b-19
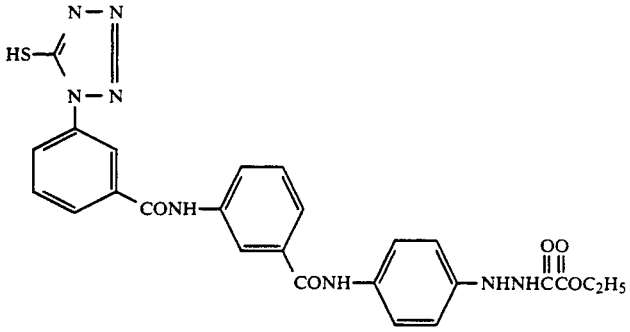
I-b-20
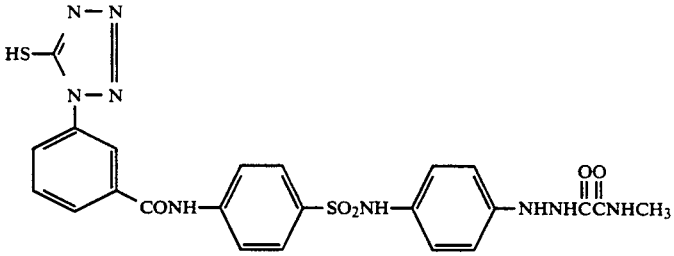
I-b-21
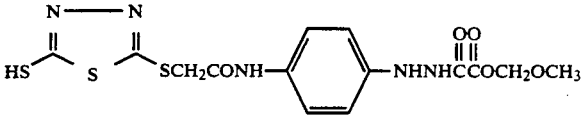
I-b-22
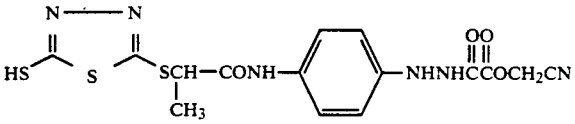

-continued
I-b-23
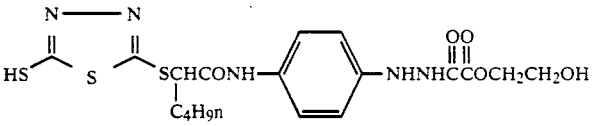
I-b-24
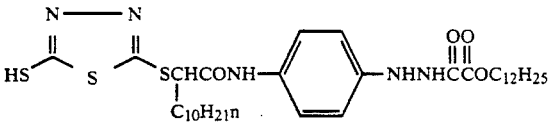
I-b-25
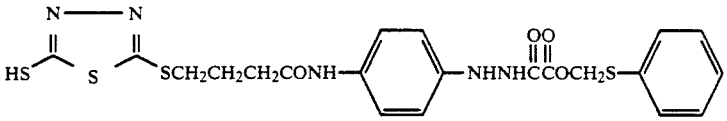
I-b-26
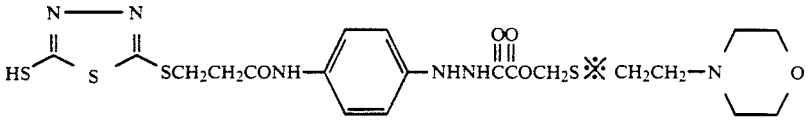
I-b-27
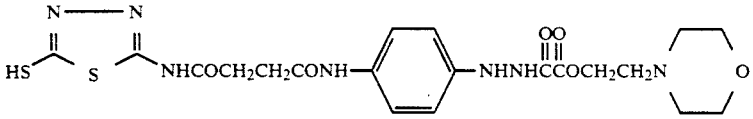
I-b-28
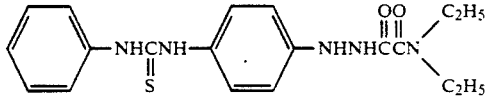
I-b-29
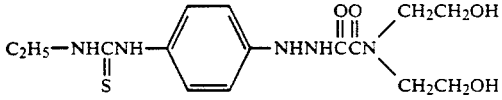
I-b-30
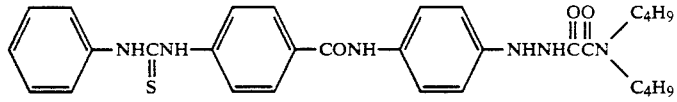
I-b-31
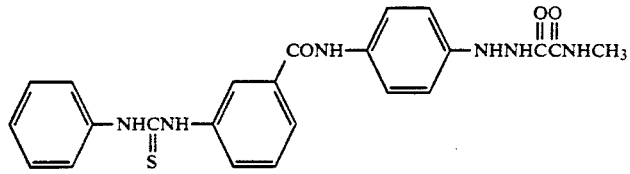
I-b-32
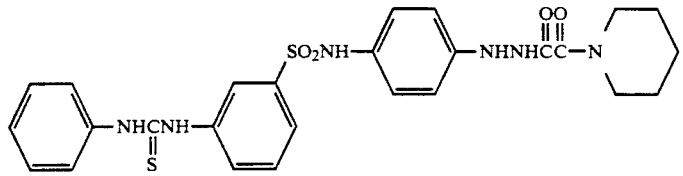
I-b-33

-continued
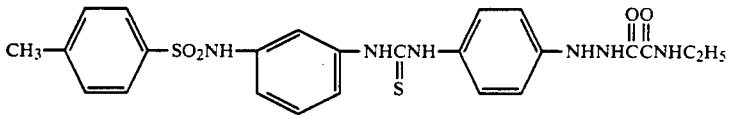
I-b-34
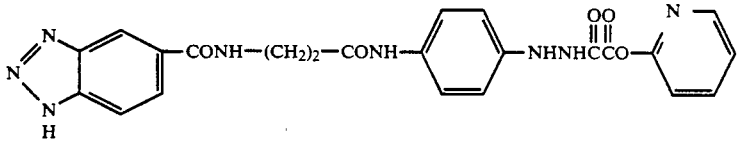
I-b-35
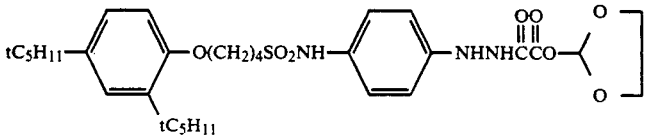
I-b-36
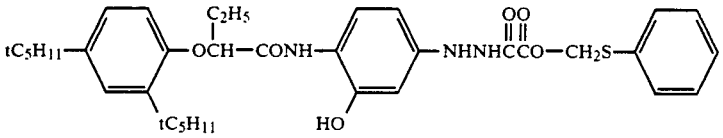
I-b-37
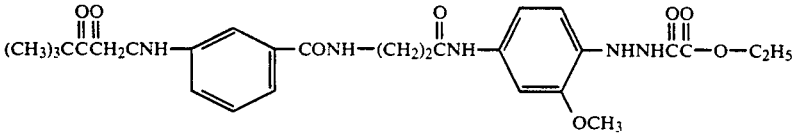
I-b-38
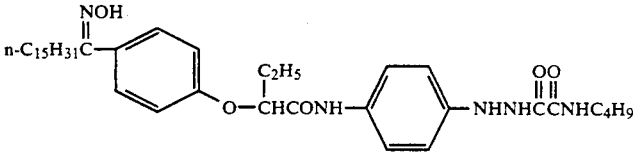
I-b-39
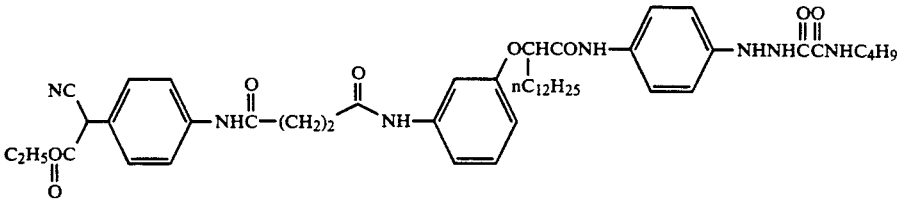
I-b-40
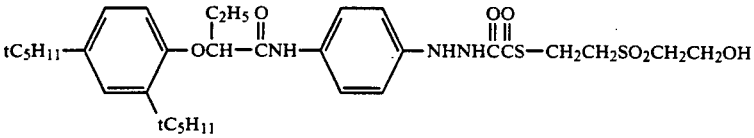
I-b-41

-continued
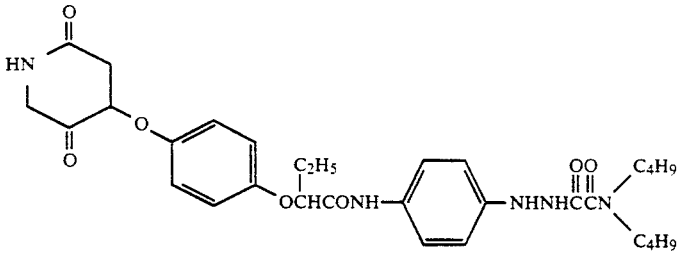
I-b-42
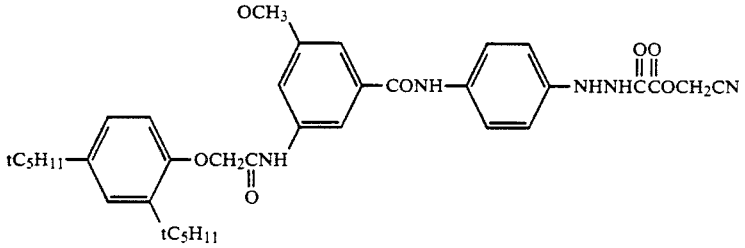
I-b-43
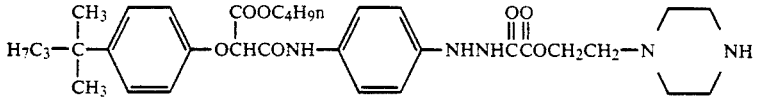
I-b-44
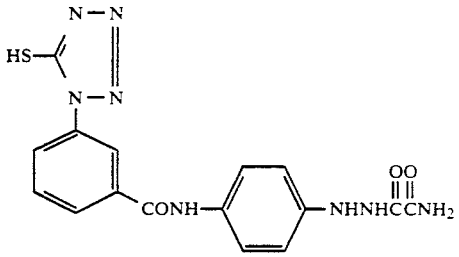
I-b-45
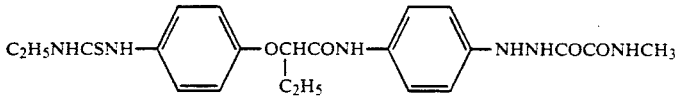
I-b-46
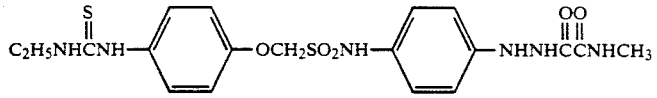
I-b-47
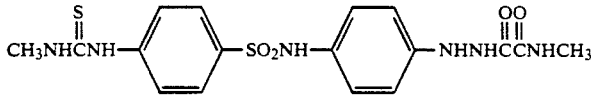
I-b-48
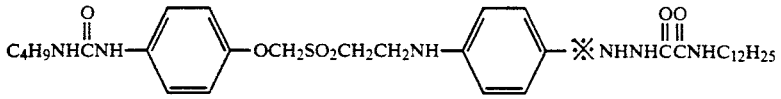
I-b-49
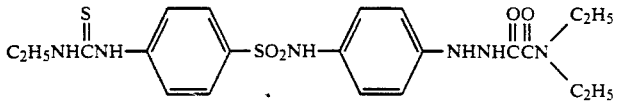

-continued
I-b-50
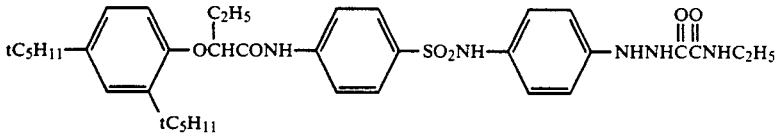
I-b-51
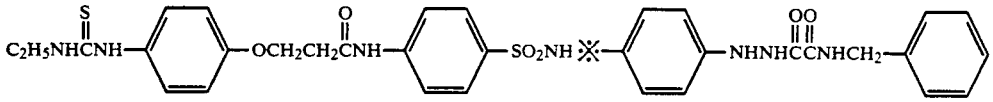
I-b-52
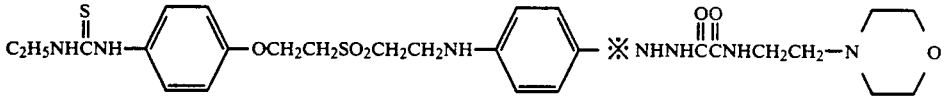
I-b-53
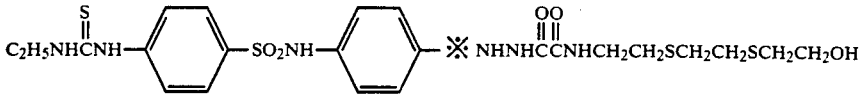
I-b-54
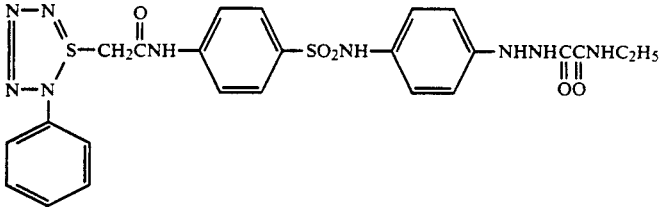
I-b-55
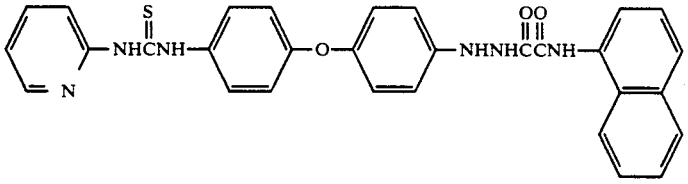
I-b-56
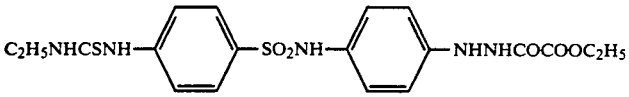
I-b-57
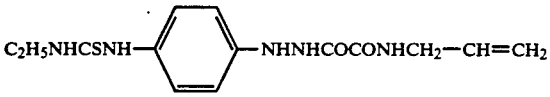
I-b-58
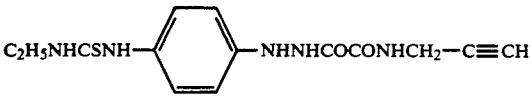
I-b-59
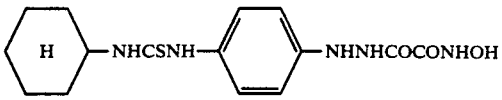

-continued
I-b-60
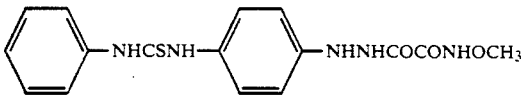
I-b-61
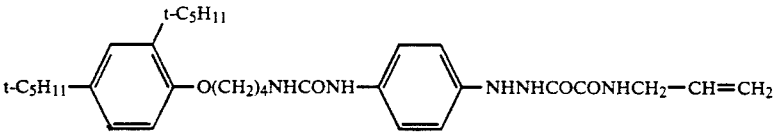
I-b-62
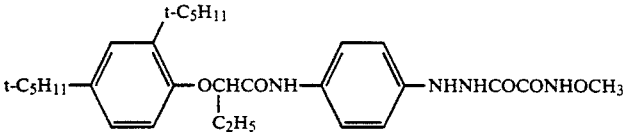
I-b-63
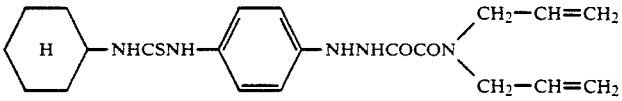
I-b-64
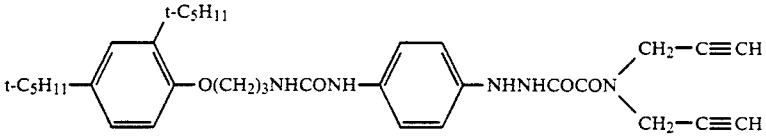
I-b-65
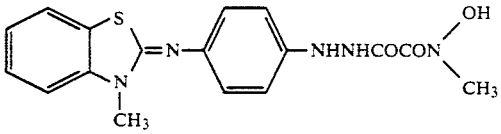
I-b-66
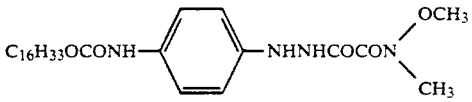
I-b-67
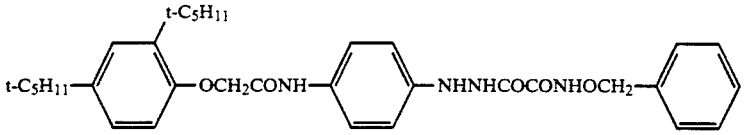
I-b-68
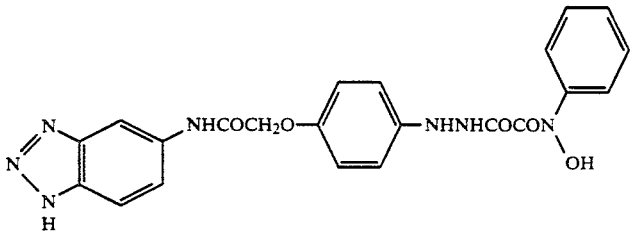
I-b-69

-continued
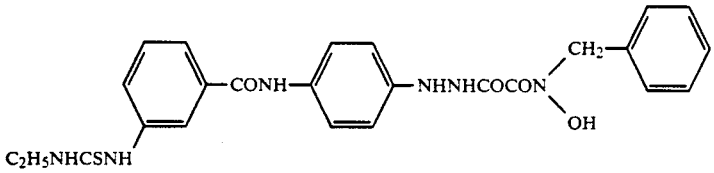
I-b-70
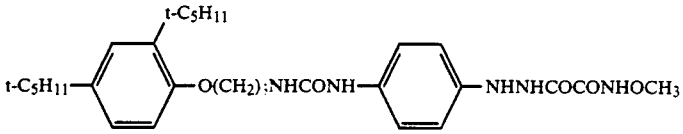
I-b-71
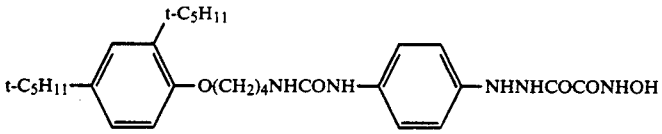
I-b-72
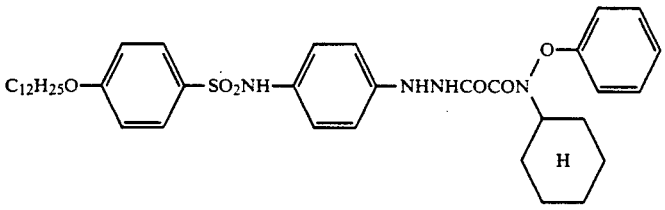
I-b-73
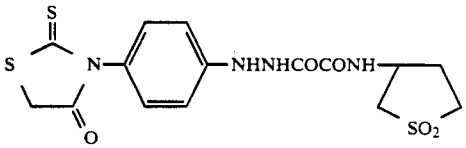
I-b-74
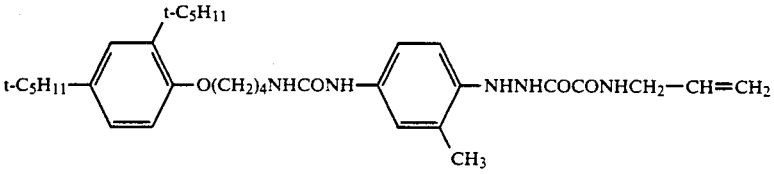
I-b-75
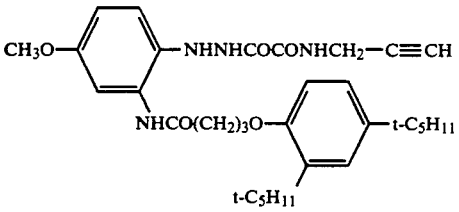
I-b-76
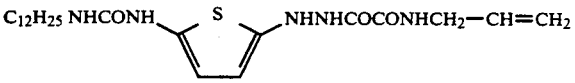
I-b-77
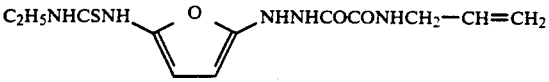
I-b-78

-continued
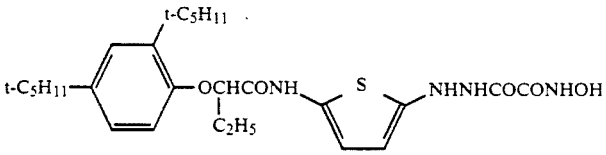
I-b-79
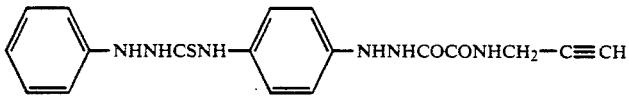
I-b-80
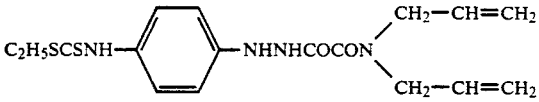
I-b-81
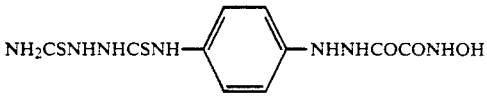
I-b-82
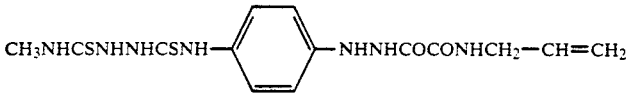
I-b-83
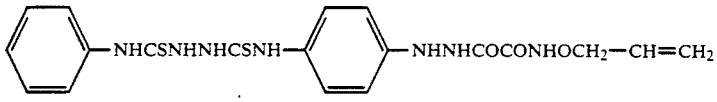
I-b-84
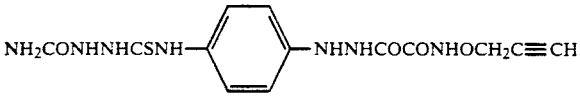
I-b-85
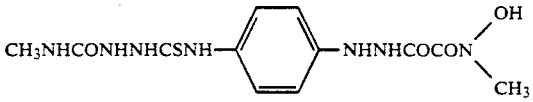
I-b-86
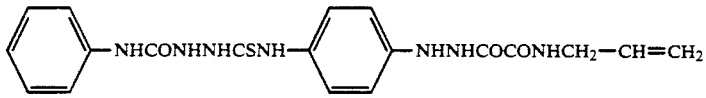
I-b-87
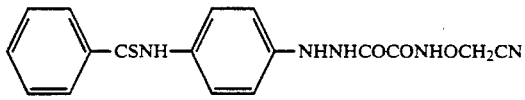
I-b-88
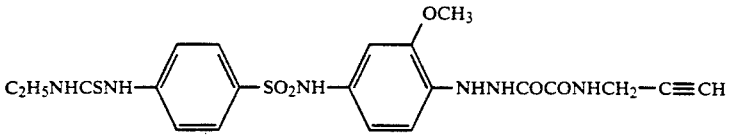
I-b-89

-continued
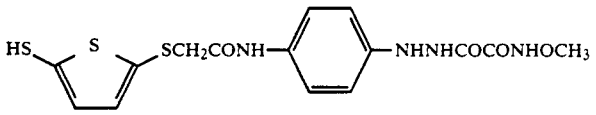
I-b-90
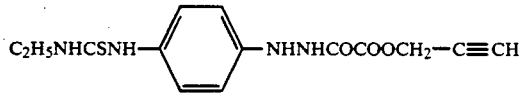
I-b-91
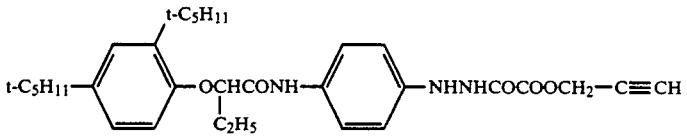
I-b-92
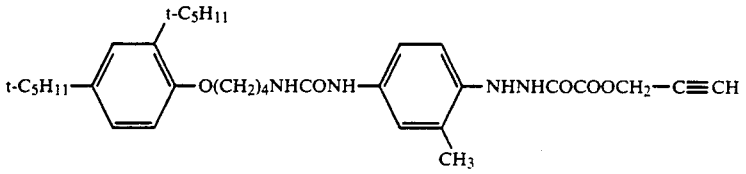
I-b-93
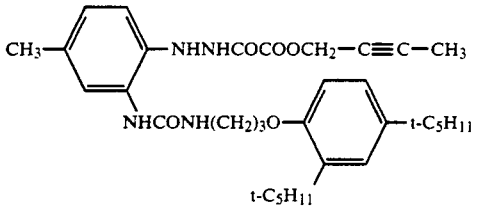
I-b-94
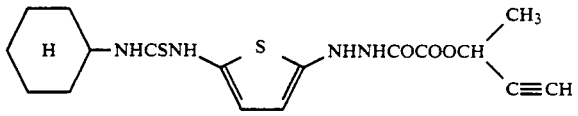
I-b-95
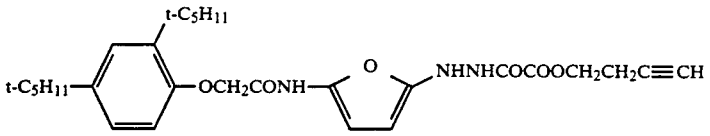
I-b-96
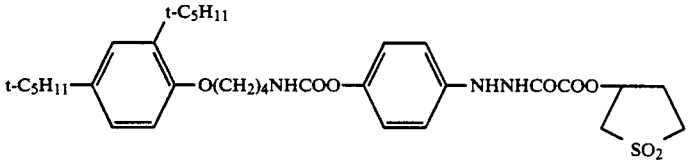
I-b-97
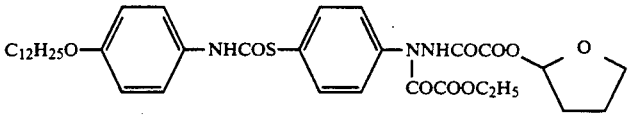
I-b-98

-continued
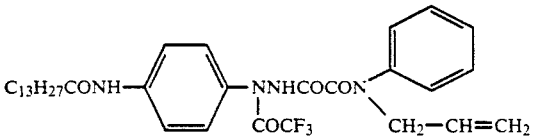
I-b-99
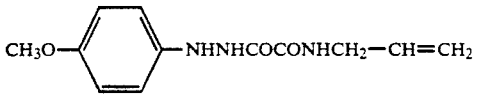
I-b-100
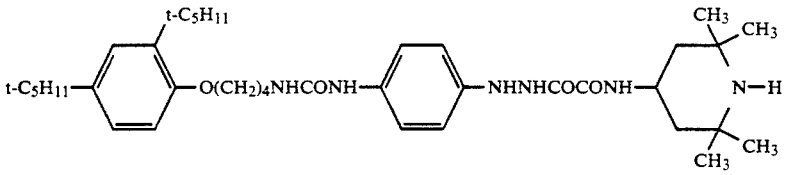
I-b-101
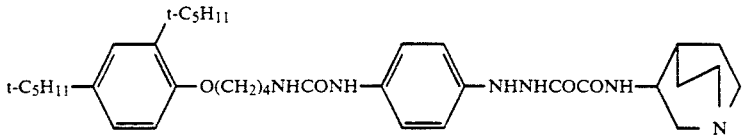
I-b-102
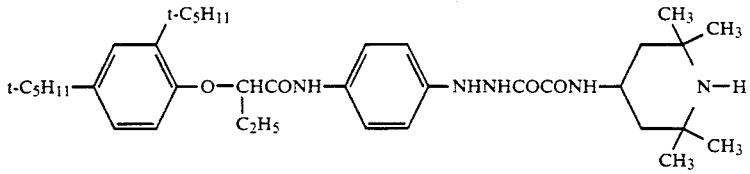
I-b-103
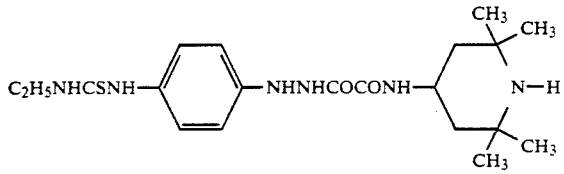
I-b-104
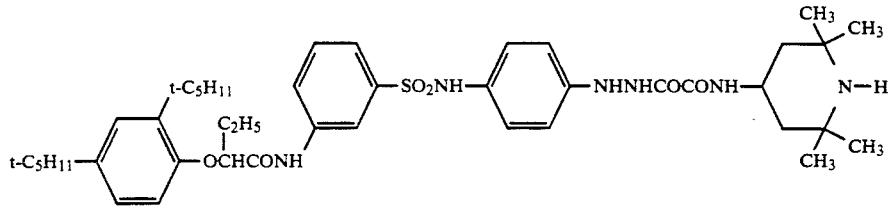
I-b-105
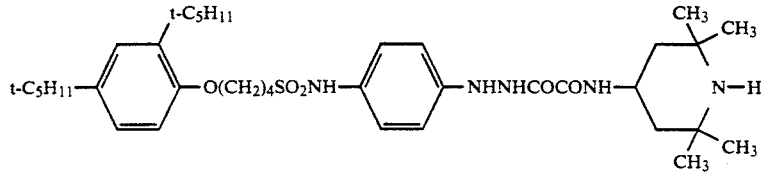
I-b-106

-continued
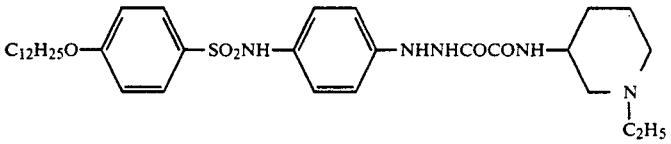
I-b-107
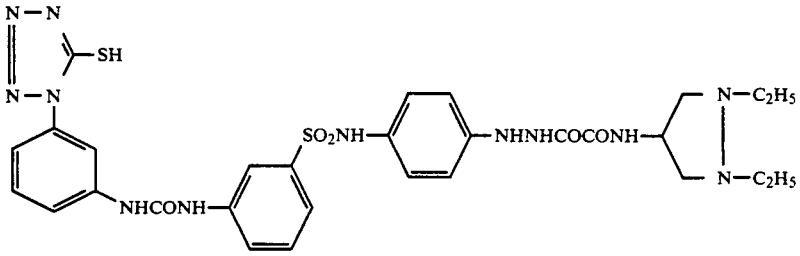
I-b-108
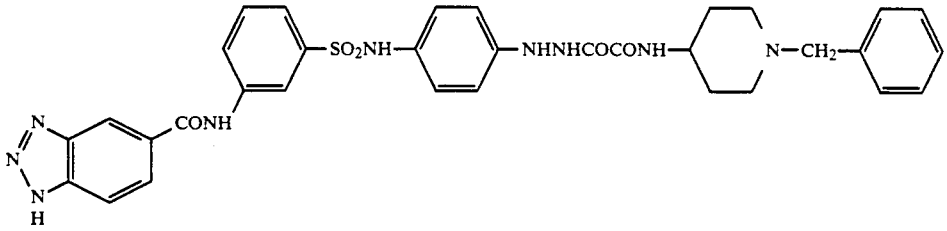
I-b-109
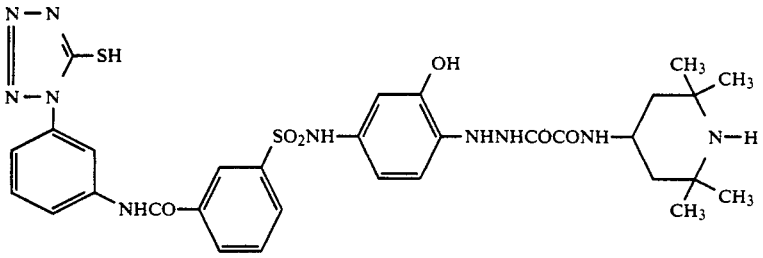
I-b-120
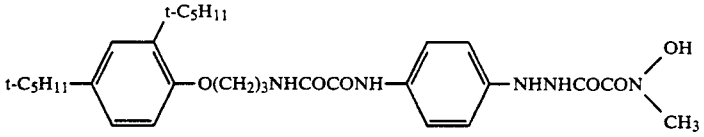
I-b-121
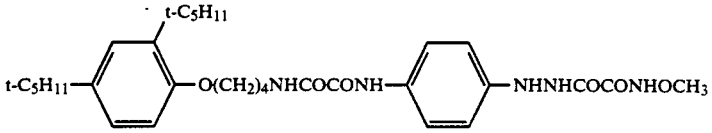
I-b-122
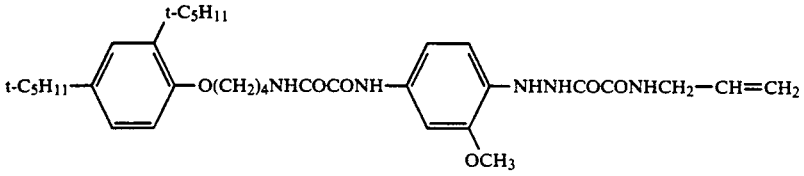
I-b-123

-continued
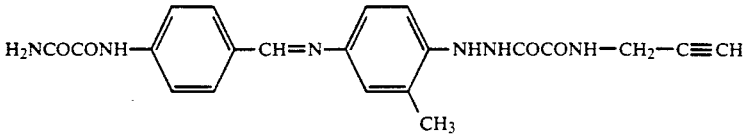
I-b-124
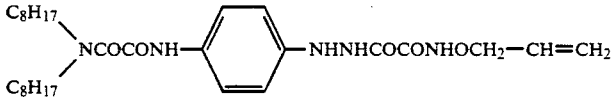
I-b-125
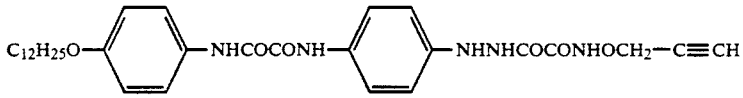
I-b-110
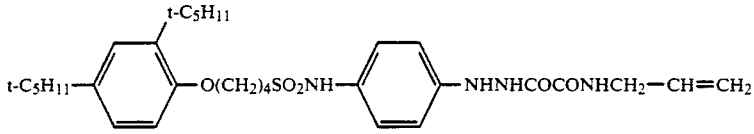
I-b-111
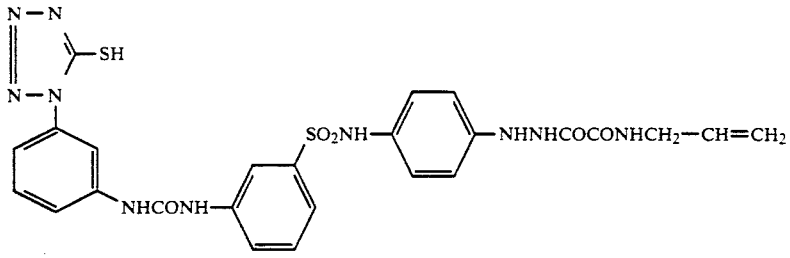
I-b-112
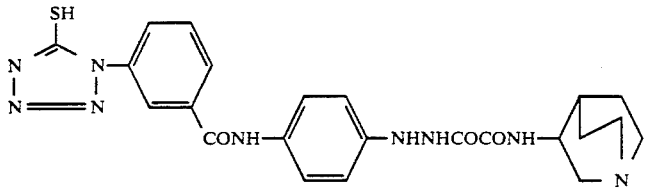
I-b-113
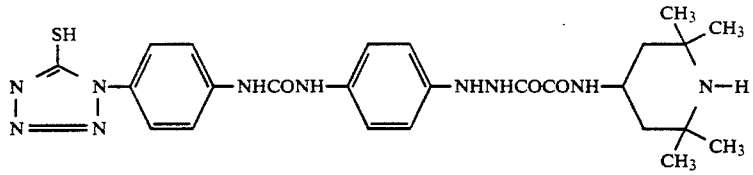
I-b-114
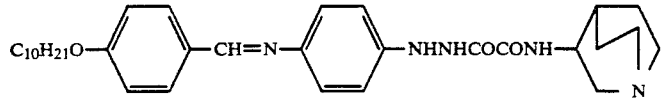
I-b-115
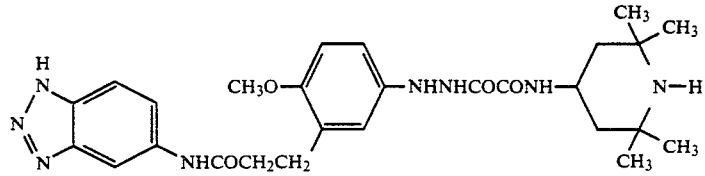
I-b-116

-continued
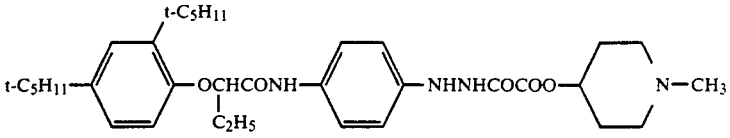
I-b-117
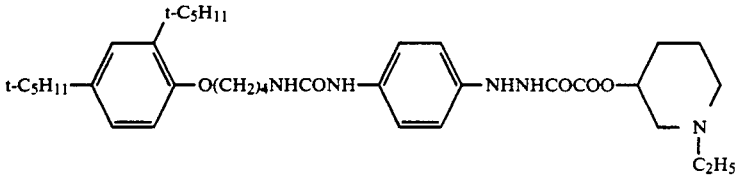
I-b-118
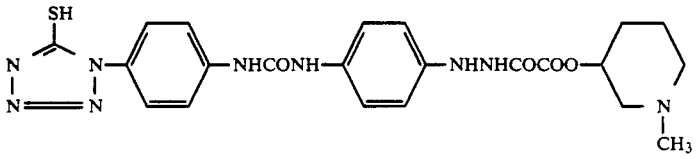
I-b-119
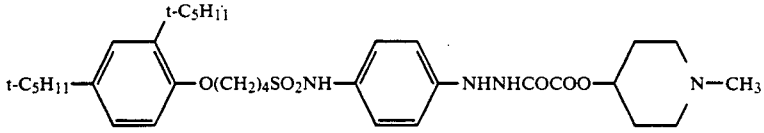
I-b-119′
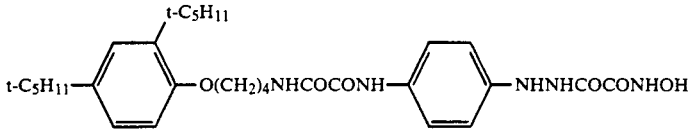
I-b-126
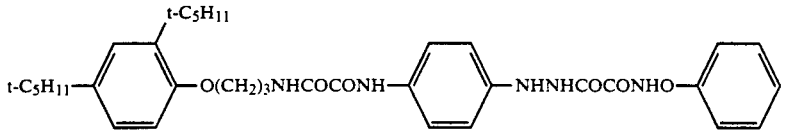
I-b-127
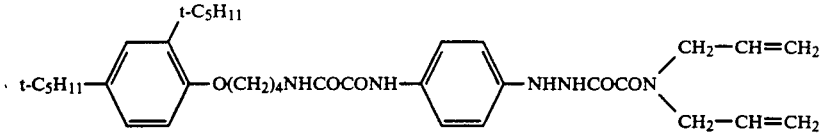
I-b-128
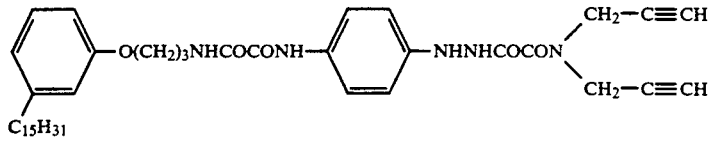
I-b-129
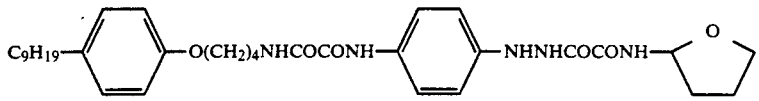
I-b-130

-continued
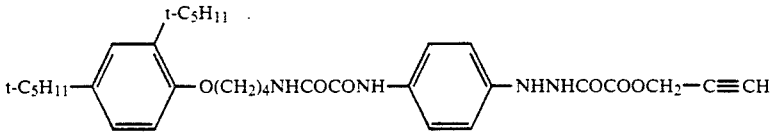
I-b-131
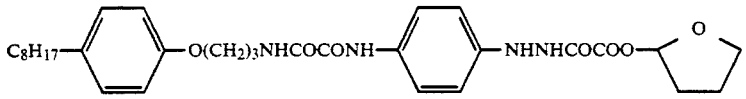
I-b-132
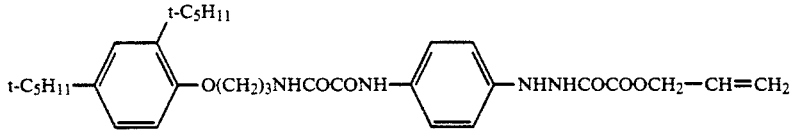
I-b-133
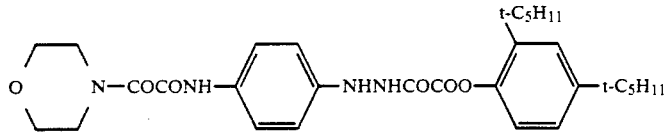
I-b-134
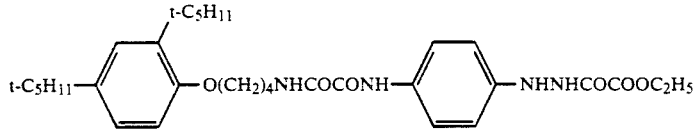
I-b-135
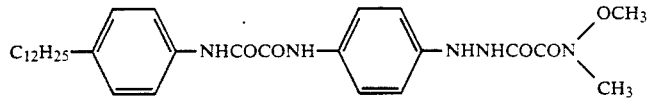
I-b-136
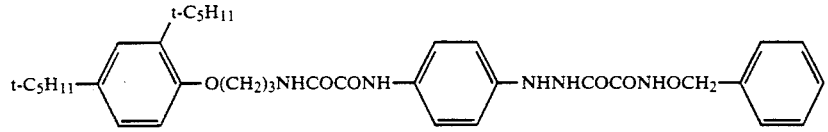
I-b-137
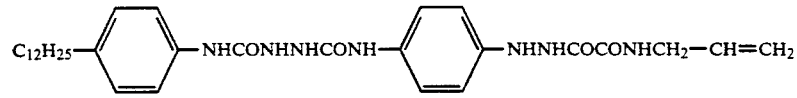
I-b-138
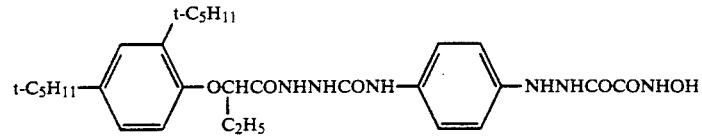
I-b-139
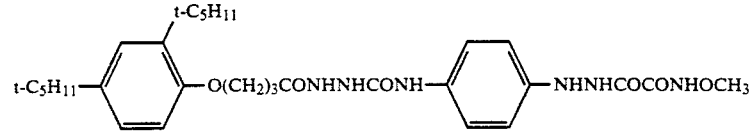
I-b-140

-continued
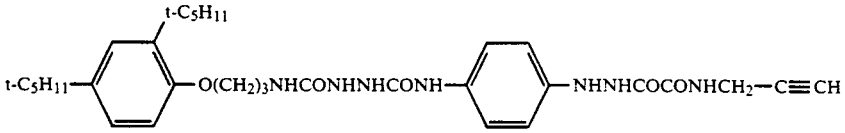
I-b-141
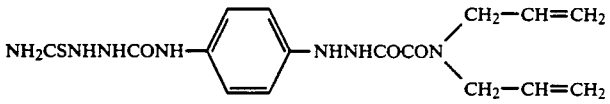
I-b-142
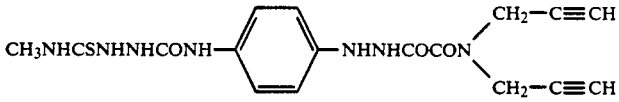
I-b-143
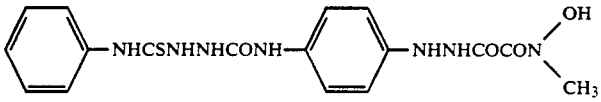
I-b-144
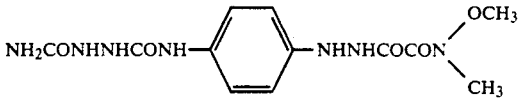
I-b-145
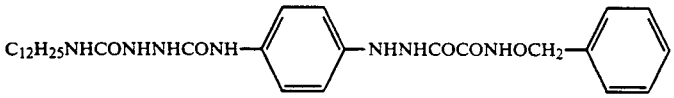
I-b-146
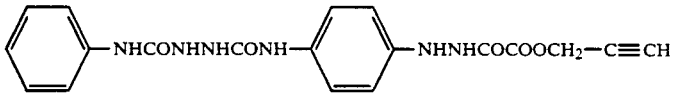
I-b-147
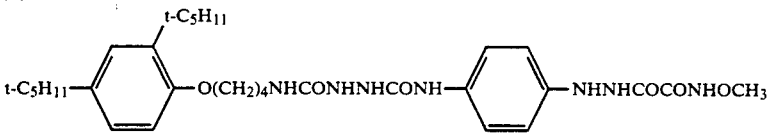
I-b-148
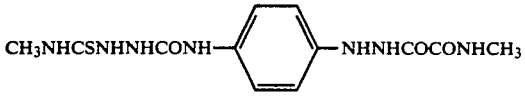
I-b-149
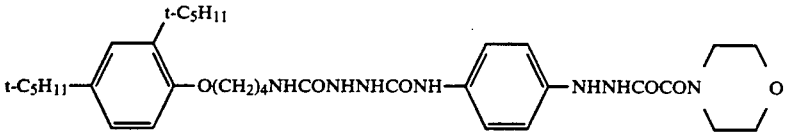
I-b-150
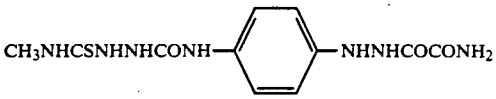
I-b-151

-continued
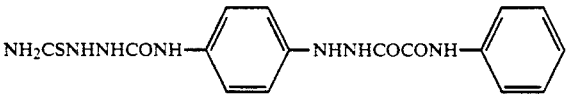
I-b-152
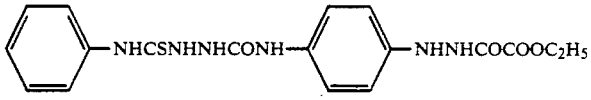
I-b-153
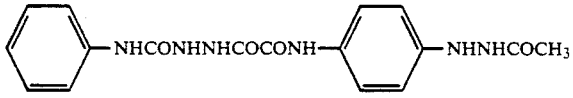
I-b-154
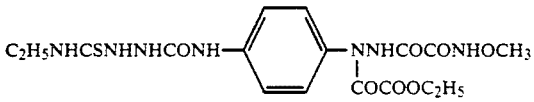
I-b-155
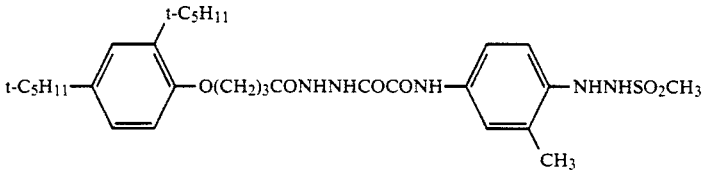
I-b-156
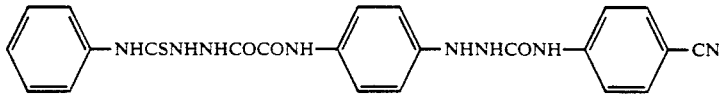
I-b-157
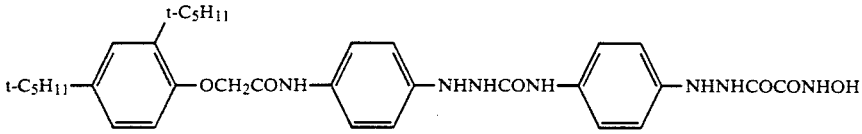
I-b-158
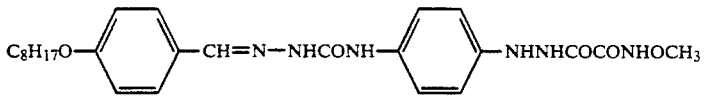
I-b-159
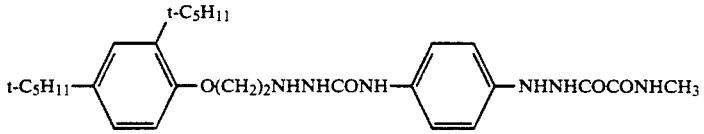
I-b-160
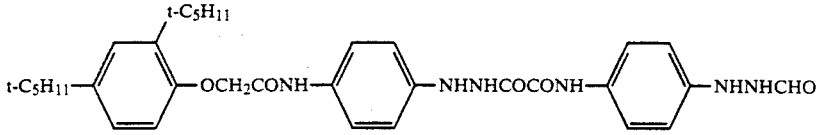
I-b-161

-continued
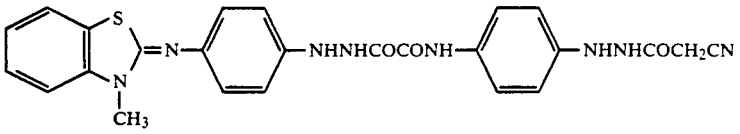
I-b-162
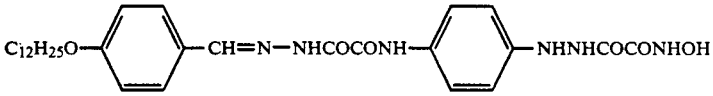
I-b-163
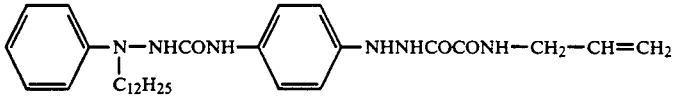
I-b-164
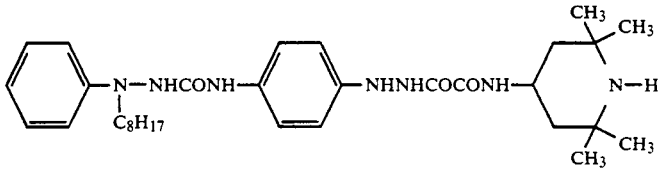
I-b-165
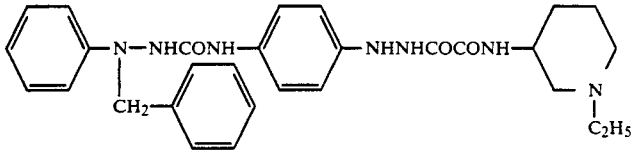
I-b-166
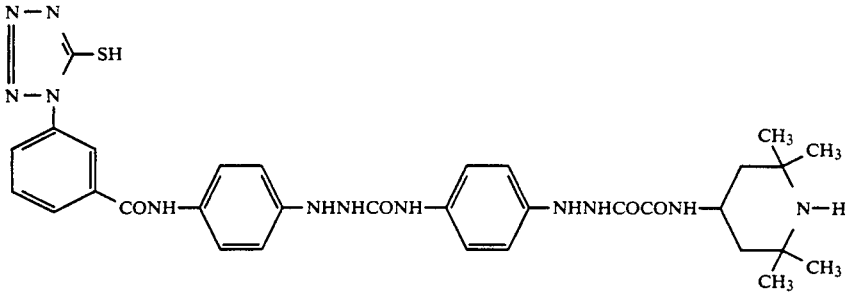
I-b-167
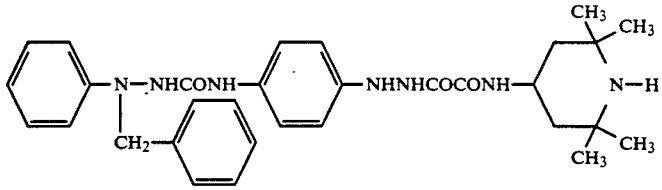
I-b-168
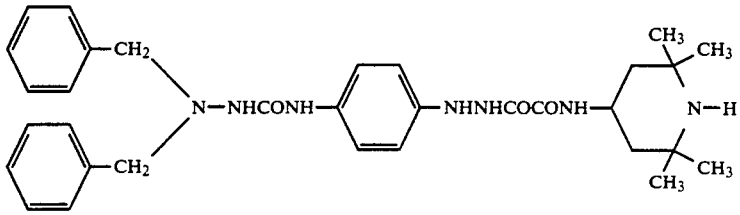

Next, among the above specific compounds, synthetic methods of the compounds (I-b-45) and (I-b-47) are exemplified.

Reaction scheme

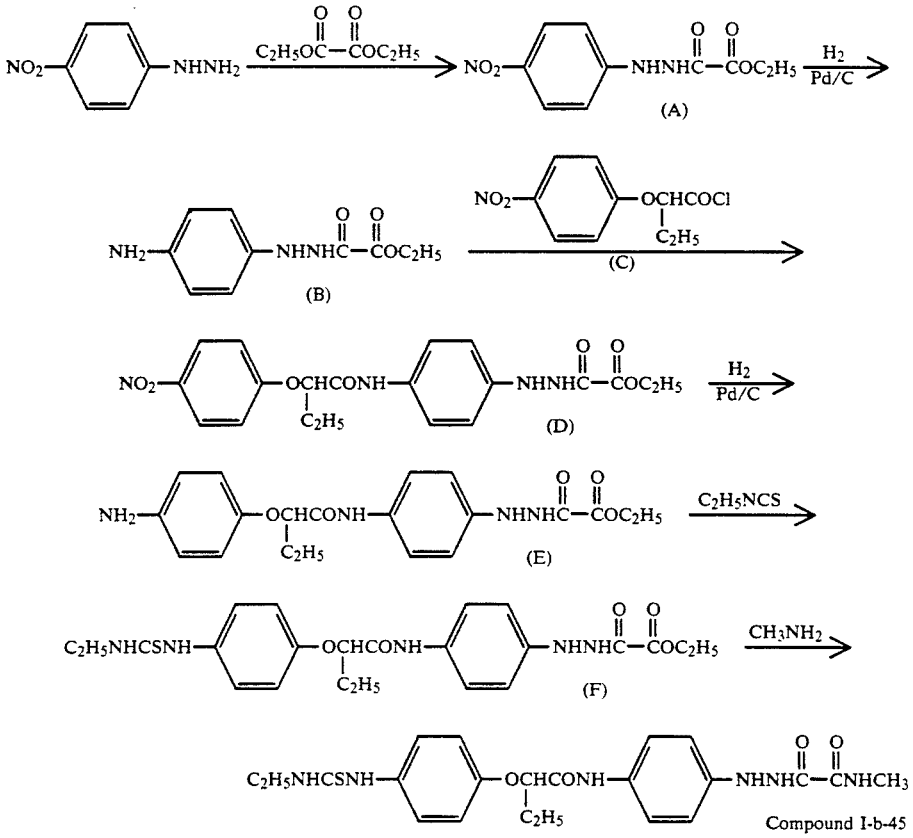

153 g of the compound 4-nitrophenylhydrazide and 500 ml of diethyloxalate were mixed and the mixture was stirred for one hour under reflux. While proceeding the reaction, ethanol was removed and then the mixture was cooled to precipitate crystals. The resulting crystals were filtered, washed several times with petroleum ether, and recrystallized. Next, among the resulting crystals (A), 50 g was dissolved in 1000 ml of methanol under heating and reduced under the pressure of 50 Psi of $H_2$ atmosphere in the presence of a Pd/C (palladium-carbon) catalyst to obtain the compound (B).

22 g of the compound (B) was dissolved in a solution of 200 ml of acetonitrile and 16 g of pyridine, and to the solution was added dropwise 24 g of the compound (C) in acetonitrile solution at room temperature. After insolubles were filtered off, the filtrate was condensed and purified by recrystallization to obtain 31 g of the compound (D).

30 g of the compound (D) was hydrogenated in the above manner as mentioned above to obtain 20 g of the compound (E).

10 g of the compound (E) was dissolved in 100 ml of acetonitrile, then 3.0 g ethylisothiocyanate was added thereto and the mixture was refluxed for one hour. After the solvent was removed, crude material was purified by recrystallization to obtain 7.0 g of the compound (F). 5.0 g of the compound (F) was dissolved in 50 ml of methanol, methyl, amine (8 ml, 40% aqueous solution) was added thereto and the mixture was stirred. After a part of methanol was removed, the precipitated solid was taken out and purified by recrystallization to obtain the compound I-b-45.

Synthesis of the compound I-b-47

Reaction scheme

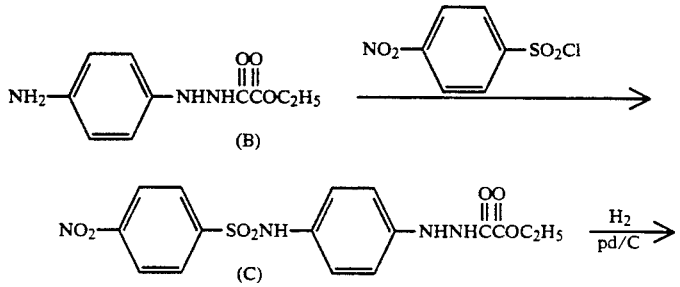

-continued

Reaction scheme

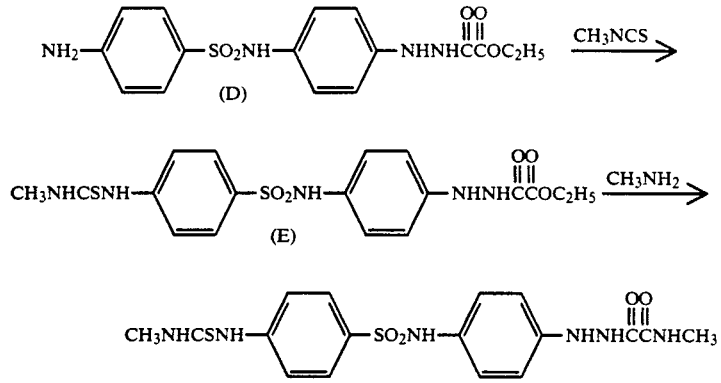

Compound I-b-47

22 g of the compound (B) was dissolved in 200 ml of pyridine and under stirring, 22 g of p-nitrobenzenesulfonyl chloride was added to the solution. The reaction mixture was poured into water, and precipitated crystals were taken out to obtain the compound (C). The compound (C) was treated in the same manner as in the compound I-b-45 to obtain the compound I-b-47.

Next, the compounds of the formula (I-c) will be explained.

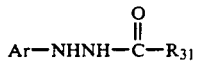

(I-c)

In the formula (I-c), Ar represents an aryl group containing at least one of a ballast group or a silver halide adsorption accelerating group. As the ballast group, those conventionally used in additives for immobilized photography such as a coupler are preferred. Such a ballast group is a group having 8 or more carbon atoms and is relatively inactive to photographic performance. It can be selected from, for example, an alkyl group, an alkoxy group, a phenyl group, an alkylphenyl group, a phenoxy group, an alkylphenoxy group, etc.

The silver halide adsorption accelerating group may include the groups as disclosed in U.S. Pat. No. 4,385,108 such as a thiourea group, a thiourethane group, a heterocyclic thioamide group, a mercapto heterocyclic group, a triazole group, etc.

$R_{31}$ represents a substituted alkyl group. The alkyl group may include a straight, branched or cyclic alkyl group, and more specifically, there may be mentioned, for example, each group of methyl, ethyl, propyl, butyl, isopropyl, pentyl, cyclohexyl, etc.

As the substituents which may be incorporated into these alkyl groups, there may be mentioned each group of alkoxy (e.g. methoxy, ethoxy, etc.), aryloxy (e.g. phenoxy, p-chlorophenoxy, etc.), heterocyclicoxy (e.g. pyridyloxy, etc.), mercapto, alkylthio (e.g. methylthio, ethylthio, etc.), arylthio (e.g. phenylthio, p-chlorophenylthio, etc.), heterocyclicthio (e.g. pyridylthio, pyrimidylthio, thiadiazolylthio, etc.), alkylsulfonyl (e.g. methanesulfonyl, butanesulfonyl, etc.), arylsulfonyl (e.g. benzenesulfonyl, etc.), heterocyclicsulfonyl (e.g. pyridylsulfonyl, morpholinosulfonyl, etc.), acyl (e.g. acetyl, benzoyl, etc.), cyano, chloro, bromo, alkoxycarbonyl (e.g. ethoxycarbonyl, methoxycarbonyl, etc.), aryloxycarbonyl (e.g. phenoxycarbonyl, etc.), carboxy, carbamoyl, alkylcarbamoyl (e.g. N-methylcarbamoyl, N,N-dimethylcarbamoyl, etc.), arylcarbamoyl (e.g. N-phenylcarbamoyl, etc.), amino, alkylamino (e.g. methylamino, N,N-dimethylamino, etc.), arylamino (e.g. phenylamino, naphthylamino, etc.), acylamino (e.g. acetylamino, benzoylamino, etc.), alkoxycarbonylamino (e.g. ethoxycarbonylamino, etc.), aryloxycarbonylamino (e.g. phenoxycarbonylamino, etc.), acyloxy (e.g. acetyloxy, benzoyloxy, etc.), alkylaminocarbonyloxy (e.g. methylaminocarbonyloxy, etc.), arylaminocarbonyloxy (e.g. phenylaminocarbonyloxy, etc.), sulfo, sulfamoyl, alkylsulfamoyl (e.g. methylsulfamoyl, etc.), arylsulfamoyl (e.g. phenylsulfamoyl, etc.), and the like.

The hydrogen atom(s) of the hydrazine may be substituted by any of substituents such as a sulfonyl group (e.g. methanesulfonyl, toluenesulfonyl, etc.), an acyl group (e.g. acetyl, trifluoroacetyl, etc.), an oxalyl group (e.g. ethoxalyl, etc.), and the like.

Representative compounds represented by the above formula (I-c) may be exemplified as shown below.

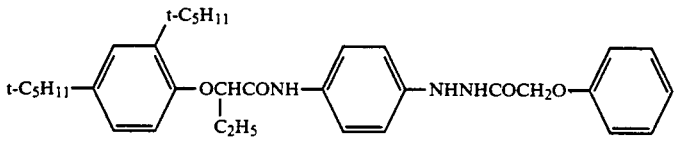

I-c-1

-continued
I-c-2
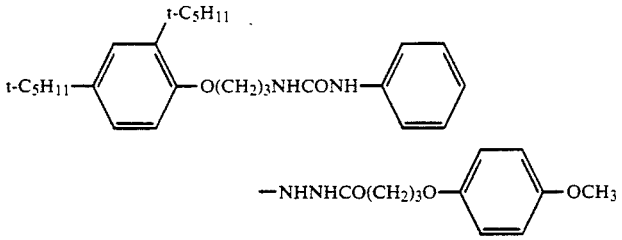
I-c-3
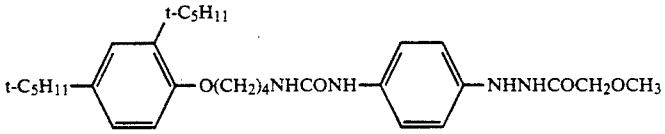
I-c-4
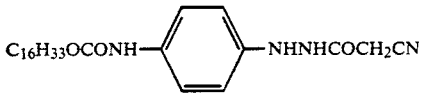
I-c-5
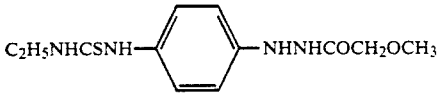
I-c-6
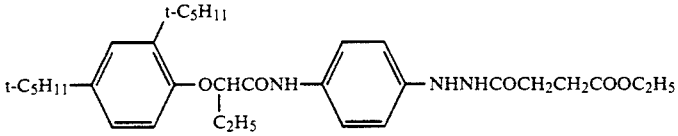
I-c-7
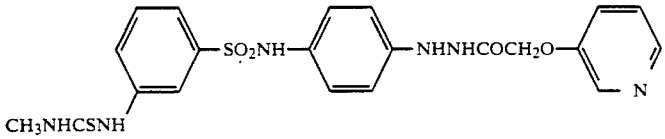
I-c-8
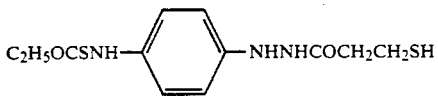
I-c-9
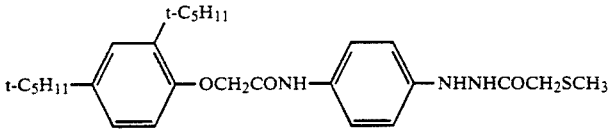
I-c-10
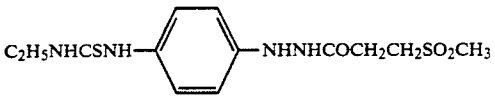
I-c-11
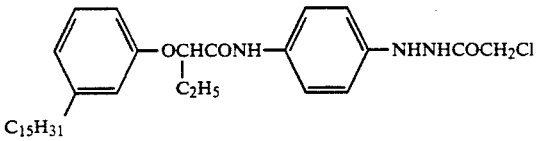
I-c-12
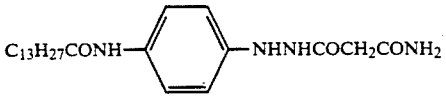

-continued
I-c-13
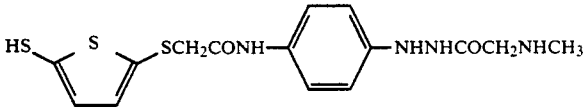
I-c-14
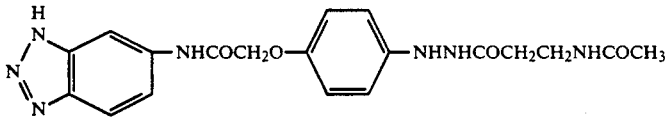
I-c-15
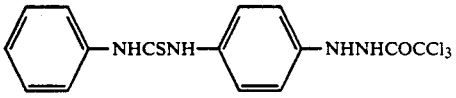
I-c-16
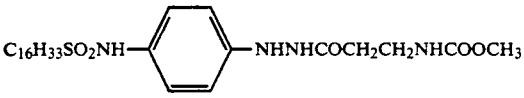
I-c-17
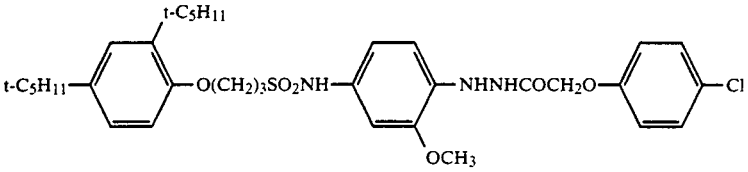
I-c-18
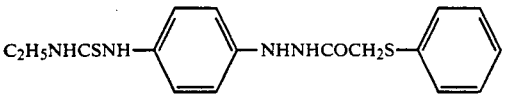
I-c-19
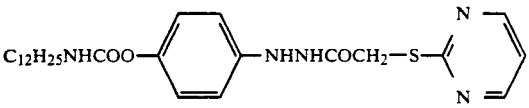
I-c-20
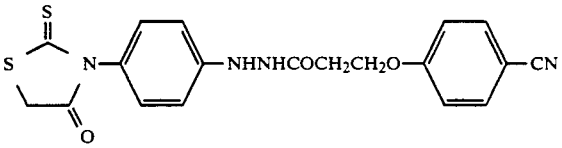
I-c-21
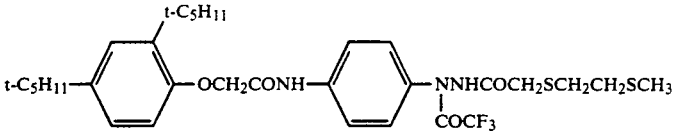
I-c-22
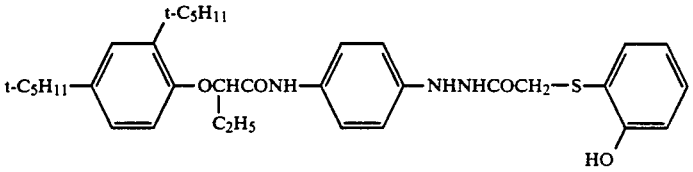
I-c-23
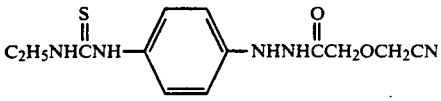
I-c-24
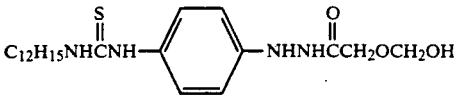

-continued
I-c-25
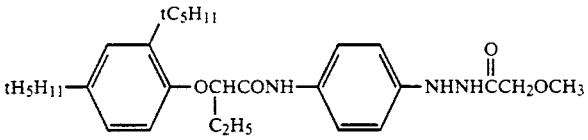
I-c-26
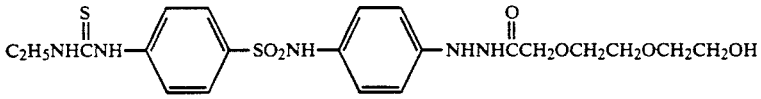
I-c-27
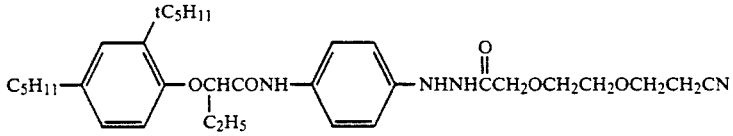
I-c-28
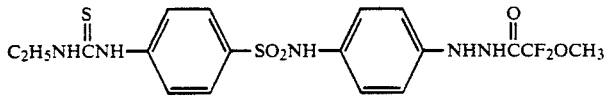
I-c-29
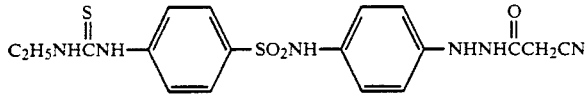
I-c-30
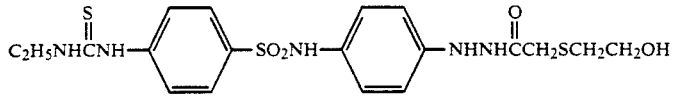
I-c-31
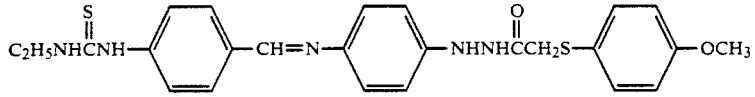
I-c-32
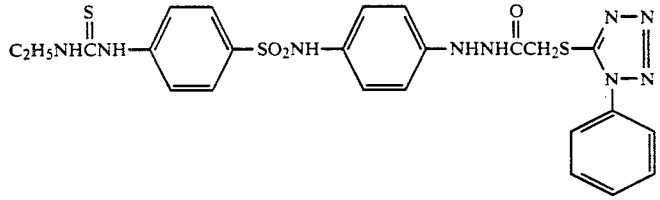
I-c-33
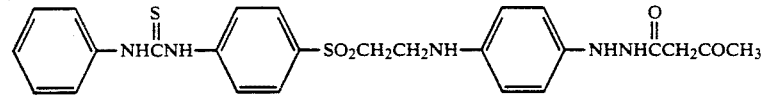
I-c-34
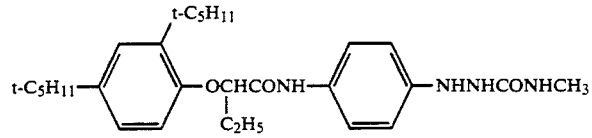
I-c-35
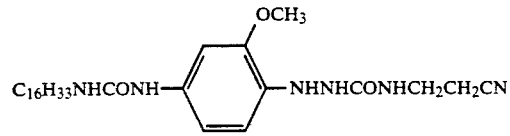
I-c-36
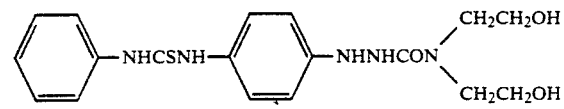

-continued
I-c-37
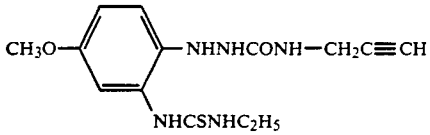
I-c-38
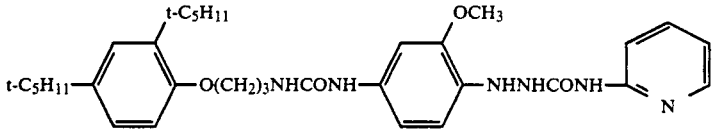
I-c-39
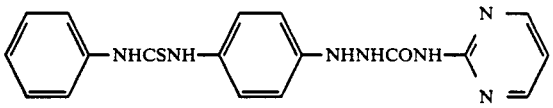
I-c-40
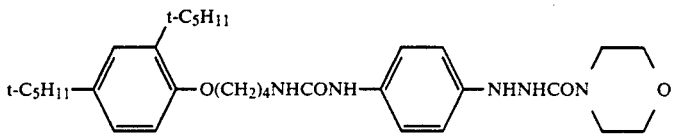
I-c-41
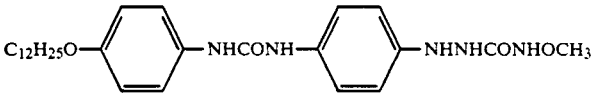
I-c-42
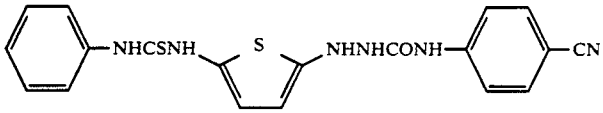
I-c-43
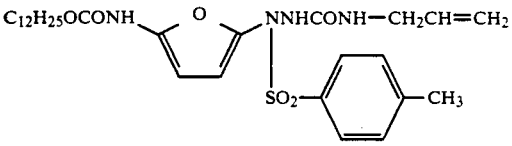
I-c-44
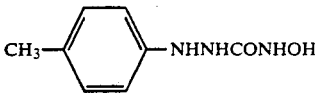
I-c-45
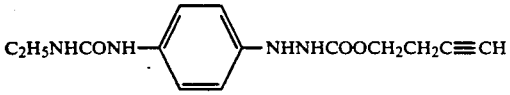
I-c-46
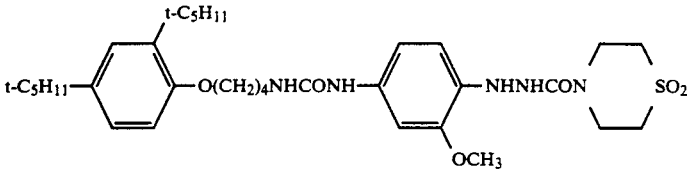
I-c-47
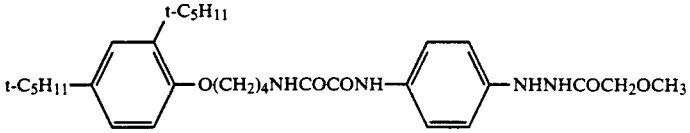

-continued
I-c-48
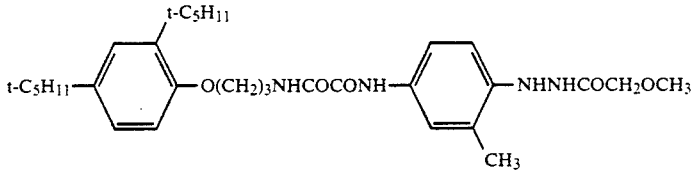
I-c-49
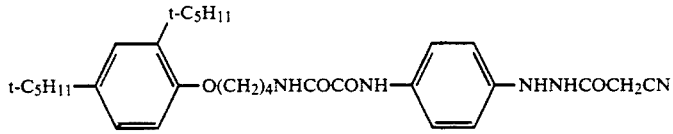
I-c-50
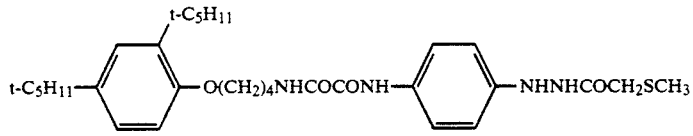
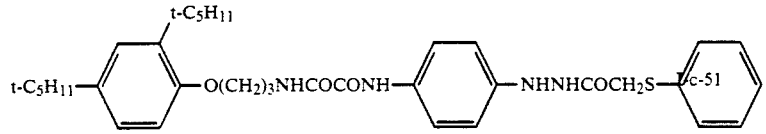
I-c-51
I-c-52
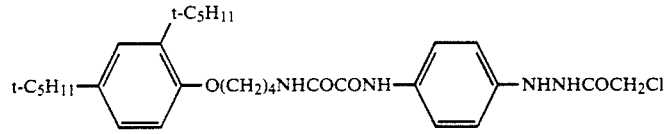
I-c-53
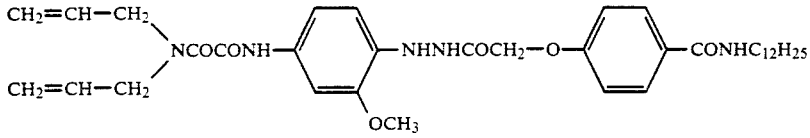
I-c-54
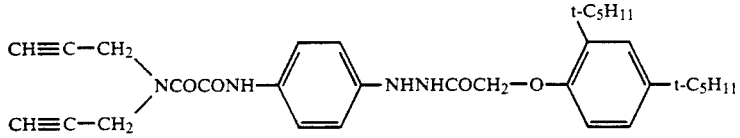
I-c-55
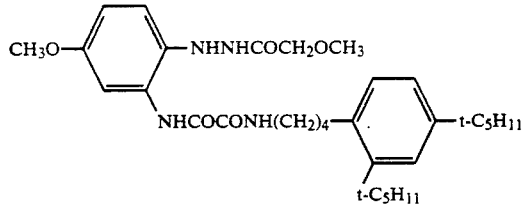
I-c-56
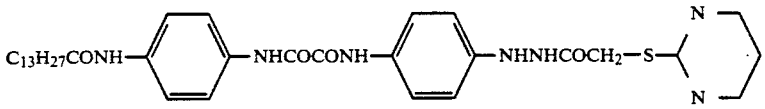
I-c-57
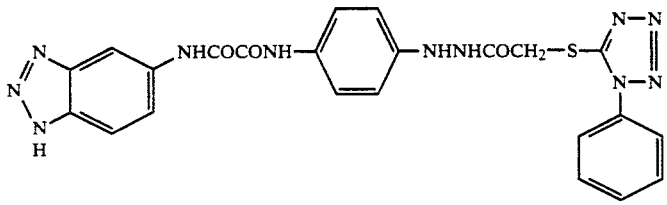

-continued
I-c-58
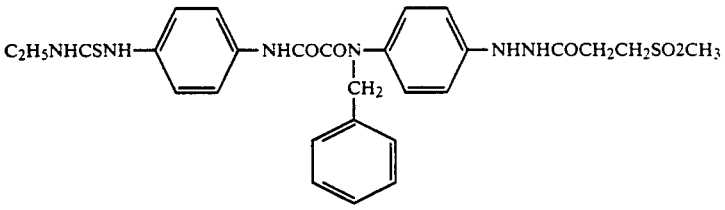
I-c-59
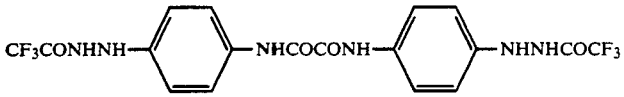
I-c-60
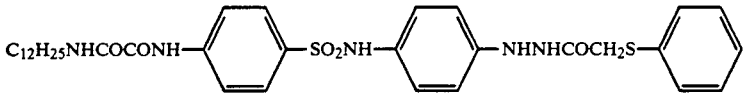
I-c-61
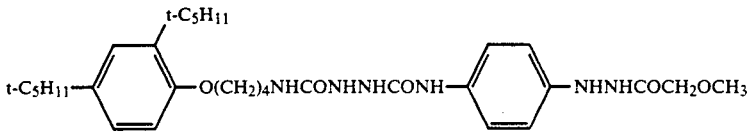
I-c-62
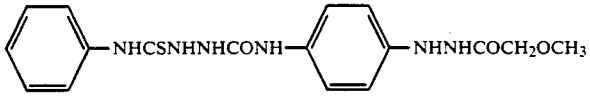
I-c-63
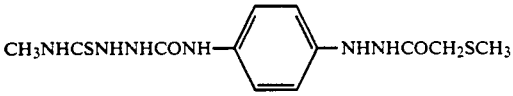
I-c-64
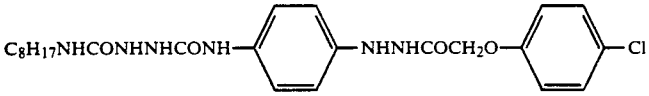
I-c-65
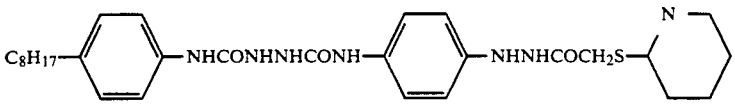
I-c-66
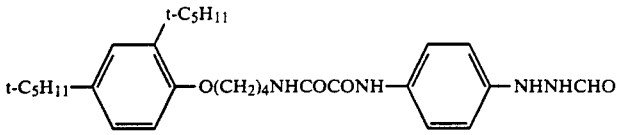
I-c-67
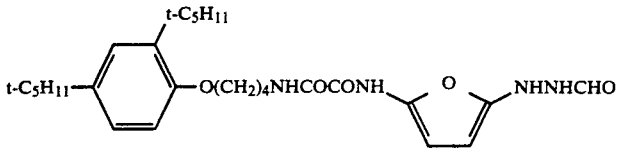
I-c-68
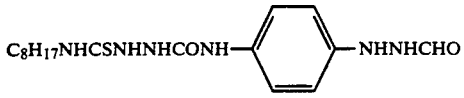
I-c-69
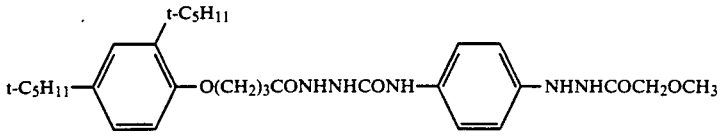

-continued
I-c-70
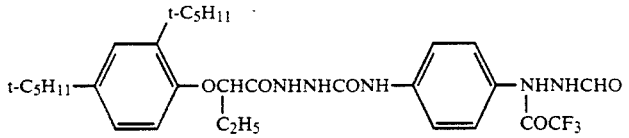
I-c-71
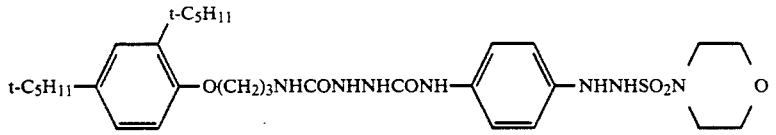
I-c-72
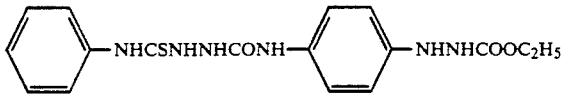
I-c-73
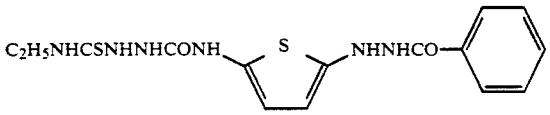
I-c-74
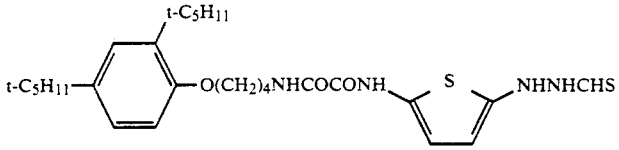
I-c-75
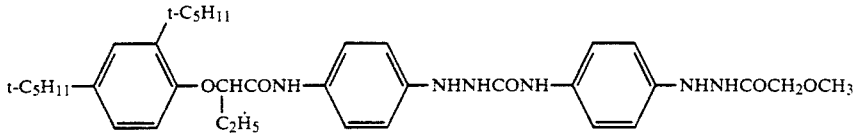
I-c-76
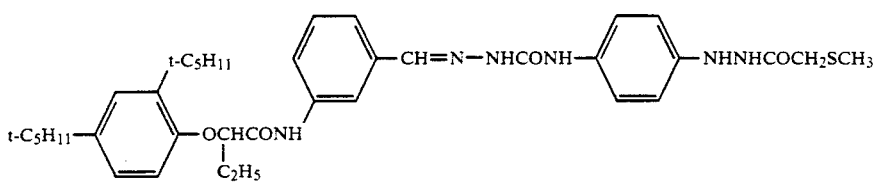
I-c-77
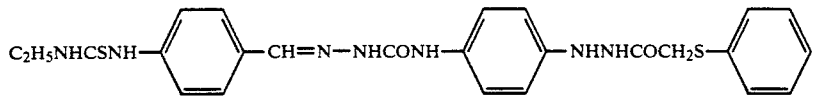
I-c-78
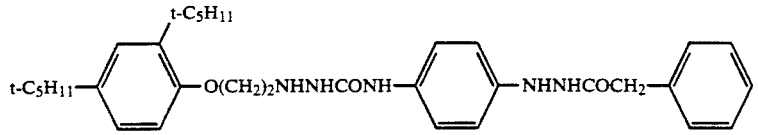
I-c-79
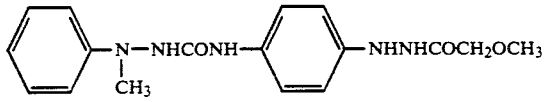
I-c-80
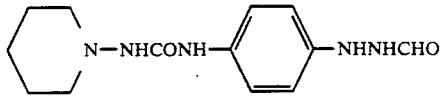

-continued
I-c-81
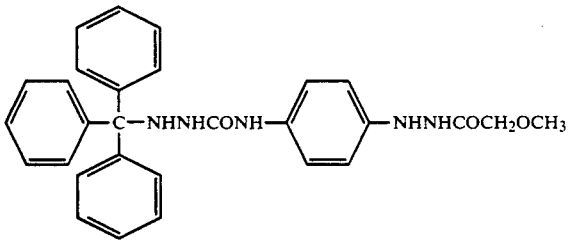
I-c-82
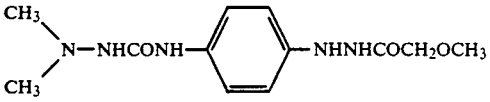
I-c-83
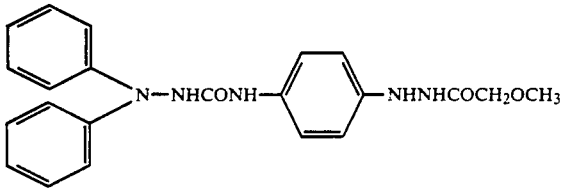
I-c-84
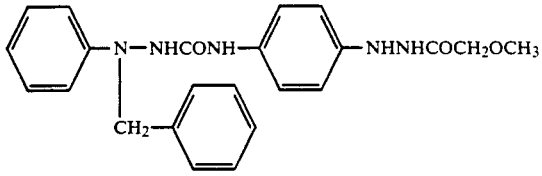
I-c-85
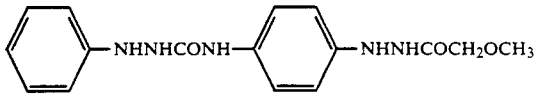
I-c-86
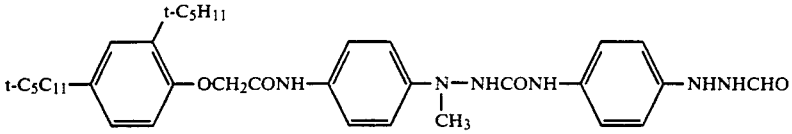
I-c-87
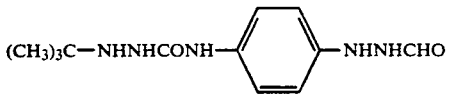
I-c-88
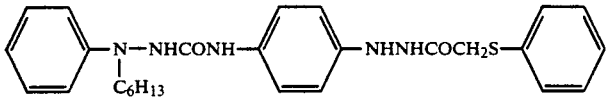
I-c-89
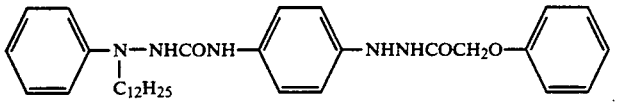
I-c-90
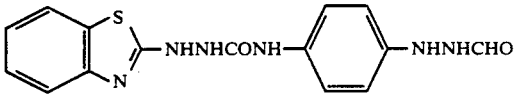

-continued

I-c-91

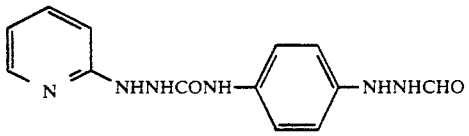

I-c-92

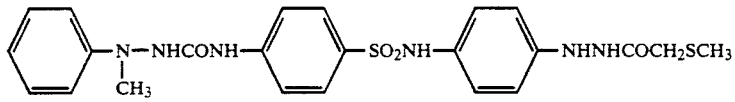

I-c-93

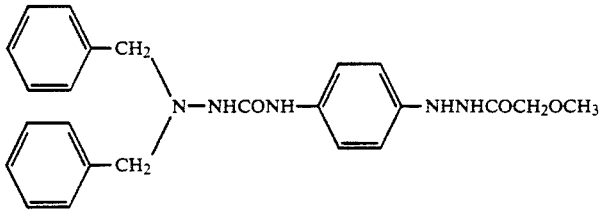

Next, synthesis example of the compound I-c-5 will be explained.

Synthesis of the compound I-c-5

Reaction scheme

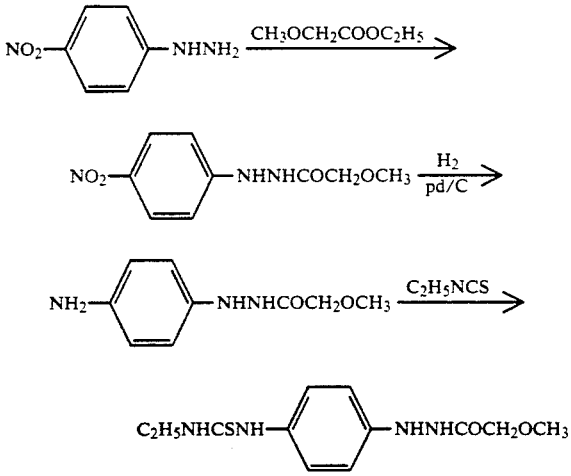

In accordance with the synthesis method of the compound I-b-45, the compound I-c-5 was obtained. As the hydrazide derivative to be used in the present invention, the compound of the formula (I-c), and (I-c-3) is particularly preferred.

Amounts of the compounds of the formulae (I-a), (I-b) and (I-c) to be contained in the light-sensitive silver halide photographic material are each preferably in the range of $5\times10^{-7}$ to $5\times10^{-1}$ mole, more preferably $5\times10^{-5}$ to $1\times10^{-2}$ per one mole of silver halide contained in the light-sensitive silver halide photographic material of the present invention.

(II)

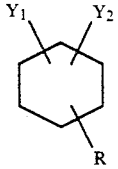

In the formula, $Y_1$ and $Y_2$ each represents an —OH group or —$CH_2OH$ group, which may be the same or different from each other. R represents an alkyl group having 1 to 3 carbon atoms.

Next, specific examples of the compounds represented by the formula (II) will be shown, but the present invention is not limited thereby.

(II)-1

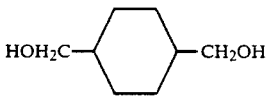

(II)-2

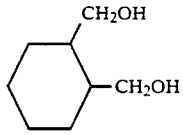

(II)-3

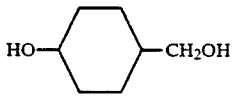

(II)-4

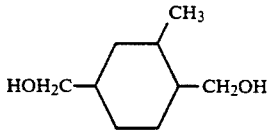

(II)-5

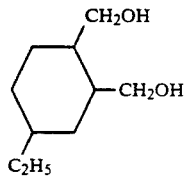

-continued (II)-6

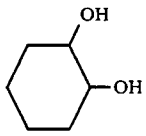

(II)-7

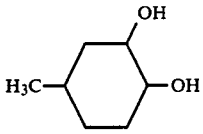

(II)-8

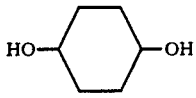

(II)-9

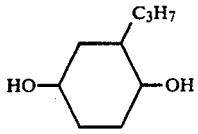

(II)-10

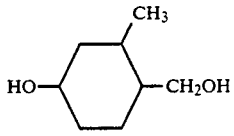

(III)

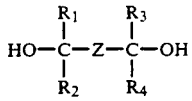

In the formula, $R_1$, $R_2$, $R_3$ and $R_4$ may be the same or different and each represents a hydrogen atom or a lower alkyl group, and Z represents $-(CH_2)_n-$ (where n represents 0 or an integer of 1 to 5),

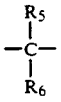

(where $R_5$ and $R_6$ each represent a hydrogen atom, a methyl group, an ethyl group or an isopropyl group provided that the case where both of $R_5$ and $R_6$ are hydrogen atom is excluded), $-CH_2O-CH_2-$, $-CH=CH-$, $-C\equiv C-$ or

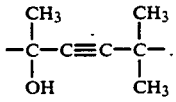

Next, specific examples of the compounds represented by the formula (III) will be shown, but the present invention is not limited thereby.

$HOCH_2-CH_2OH$ (III)-1

$HOCH(CH_3)-CH(CH_3)OH$ (III)-2

$HOCH(C_4H_9)-CH(C_4H_9)OH$ (III)-3

-continued $HOCH_2CH_2CH_2OH$ (III)-4

$HOCH(CH_2)C(CH_3)_2OH$ (III)-5

$HOCH(C_3H_7)CH(C_3H_7)OH$ (III)-6

$HOCH(C_2H_5)-(CH_2)_2-CH(C_2H_5)OH$ (III)-7

$HOCH_2(CH_2)_3CH_2OH$ (III)-8

$HOCH(CH_3)(CH_2)_4CH(CH_3)OH$ (III)-9

$HOCH_2(CH_2)_5CH_2OH$ (III)-10

$HOCH_2-C(CH_3)(C_3H_7)-CH_2OH$ (III)-11

$HOCH(CH_3)-C(CH_3)(C_2H_5)-CH(CH_3)OH$ (III)-12

$HOCH(C_3H_7)-C(H)(C_3H_7)-CH_2OH$ (III)-13

$HOCH_2CH_2OCH_2CH_2OH$ (III)-14

$HOCH(CH_3)CH_2OCH_2CH(CH_3)OH$ (III)-15

$HOC(CH_3)_2CH_2OCH_2C(CH_3)_2OH$ (III)-16

$HOCH(CH_3)CH=CH(CH_3)OH$ (III)-17

$HOCH_2CH=CHCH_2OH$ (III)-18

$HOCH_2C\equiv CCH_2OH$ (III)-19

$HOC(CH_3)_2C\equiv C(CH_3)_2OH$ (III)-20

$HOC(CH_3)(CH_3)-C(CH_3)(OH)-C\equiv C-C(OH)(CH_3)-C(CH_3)_2OH$ (III)-21

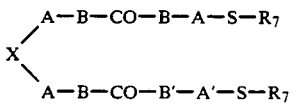

(IV)

In the formula, A represents a lower alkylene group, $$\text{-}(CH_2CH_2O)_p\text{-},\ \text{-}(CH_2CH_2O)_pCH_2\text{-}\ \text{or}$$

$$\text{-}CH_2\text{-}(CH(CH_3)CH_2O)_p\text{-};$$

B represents a polyalkylene ether group which does not bond with O; A′ represents a lower alkylene group or a polyalkylene ether group represented by the formula:

$$\text{-}(CH_2CH_2O)_pCH_2\text{-}CH_2\text{-}\ \text{or}$$

$$\text{-}(CH(CH_3)CH_2O)_p(CH(CH_3))\text{-}CH_2\text{-},$$

provided that A and A′ cannot be the polyalkylene ether groups at the same time. p represents 2 to 30.

B and B′ each represents —NH— or —O— but the case where both of B and B′ are —O—'s is excluded.

$R_7$ represents a lower alkyl group, a phenyl group, an aralkyl group or $\text{-}(CH_2)_q\text{-}COOR'$ (where R′ represents a lower aralkyl group), q represents 1 to 3, and X represents a divalent group represented by —S—, —O—, $$\text{-}CH_2\text{-},\ \text{-}CH(CH_3)\text{-}CH_2\text{-},$$

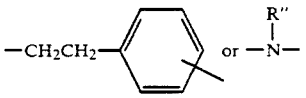

(where R″ represents a lower alkyl group).

Next, specific examples of the compounds represented by the formula (IV) will be shown, but the present invention is not limited thereby.

$$(CH_2CH_2NHCOOCH_2CH_2SCH_2CH_2COOC_2H_5)_2S \quad \text{(IV)-1}$$

$$(CH_2CH_2NHCOOCH_2CH_2SCH_3)_2S \quad \text{(IV)-2}$$

$$(CH_2CH_2OCONHCH_2CH_2SC_2H_5)_2S \quad \text{(IV)-3}$$

$$(CH_2NHCONHCH_2CH_2SC_2H_5)_2CH_2 \quad \text{(IV)-4}$$

$$H_3C\text{-}N(CH_2CH_2CH_2NHCONHCH_2CH_2SC_2H_5)_2 \quad \text{(IV)-5}$$

$$CH_2(CH_2(OCH_2CH_2)_6OCONHCH_2CH_2SC_2H_5)_2 \quad \text{(IV)-6}$$

-continued $$(CH_2CH_2NHCOO(CH_2CH_2O)_6CH_2SC_4H_9)_2S \quad \text{(IV)-7}$$

$$S(CH_2CH_2O)_{29}CH_2CH_2OCONHCH_2SC_2H_5)_2 \quad \text{(IV)-8}$$

$$(CH_2CH_2OCONHCH_2CH_2SC_2H_5)_2O \quad \text{(IV)-9}$$

$$H_3C\text{-}CH(CH_2(OCH_2CH(CH_3))_3OCONHCH_2CH_2SC_2H_5)_2 \quad \text{(IV)-10}$$

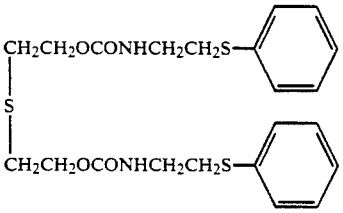

(IV)-11

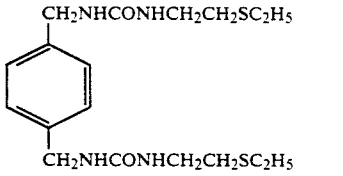

(IV)-12

$$CH_2(CH_2NHCOOCH_2CH(CH_3)CH(CH_3)(OCH_2CH)_2SC_6H_{13})_2 \quad \text{(IV)-13}$$

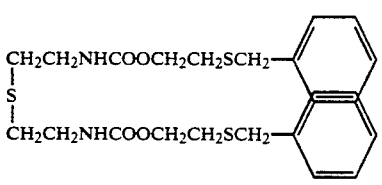

(IV)-14

$$[A\text{-}CH_2\text{-}(SO_3M)_n]_m \quad \text{(V)}$$

In the formula, A represents

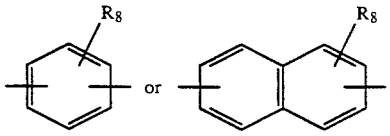

$R_8$ represents a hydrogen atom or an alkyl group having 1 to 10 carbon atoms.

n represents 1 or 2, and m represents an average degree of polymerization of an integer of 1 to 50.

M represents a hydrogen atom or an alkaline metal atom.

Next, specific examples of the compounds represented by the formula (V) will be shown, but the present invention is not limited thereby.

(V)-1

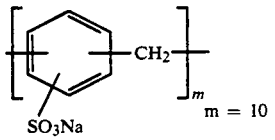

(V)-2

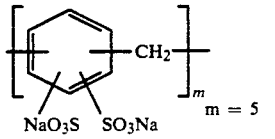

(V)-3

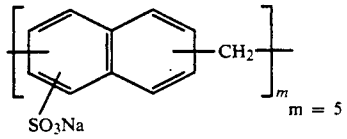

(V)-4

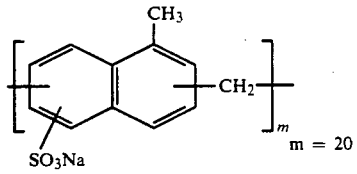

(V)-5

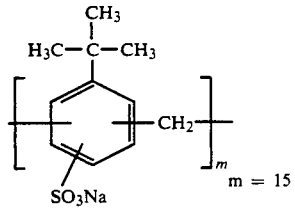

(V)-6

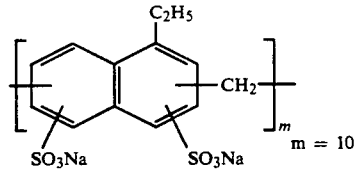

The above compounds of the formulae (II), (III), (IV) and (V) are each known compounds and can be obtained by the synthetic methods in accordance with the method as described in the following patent documents, etc.

For example, the cyclohexane derivative represented by the formula (II) can be easily obtained in accordance with the method as described in Journal of American Chemical Society, vol. 76, p. 771 (1954).

Also, the diol derivative represented by the formula (III) can be obtained by, for example, the methods as disclosed in U.S. Pat. Nos. 2,960,404 and 3,650,759, the thioether derivative represented by the formula (IV) can be easily obtained by, for example, the method as disclosed in Japanese Patent Publication No. 11116/1972, and the phenol or naphthol type aldehyde resin represented by the formula (V) can be easily obtained by, for example, the method as disclosed in Japanese Patent Publication No. 16765/1960.

Amounts of the compounds of the above formulae (II), (III), (IV) and (V) to be used in the light-sensitive silver halide photographic material of the present invention may differ depending on the kinds of the silver halide emulsion, but they may be each in the range of $1\times10^{-6}$ to $1\times10^{-1}$ mole/mole Ag, more preferably $5\times10^{-5}$ to $1\times10^{-2}$ mole/mole Ag.

These compounds may be preferably added after dissolving them in water or an organic solvent (such as methanol, etc.) which is miscible with water, but they may be added in the form of dispersion dispersed in a coating solution.

The position to which the hydrazide derivative and the compounds represented by the formulae (II), (III), (IV) and (V) of the present invention are added may be anywhere of a silver halide emulsion layer or non-light-sensitive layer, but preferably a silver halide emulsion layer.

The time at which these compounds are added may be any time in the case of a silver halide emulsion layer between the chemical ripening step and immediately before coating, but preferably at the completion of the chemical ripening.

When these compounds are added to a non-light-sensitive hydrophilic colloidal solution, it may be added at an optional stage to adjust the coating solution.

Next, the compounds of the group B will be explained.

Specific examples of the compound represented by the formula (VI) will be shown below, but these are only examples of the present invention and the present invention is not limited to these.

(VI)-1

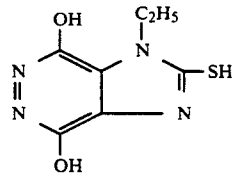

(VI)-2

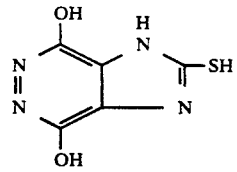

(VI)-3

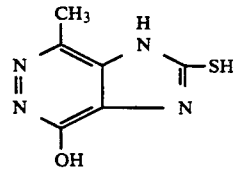

(VI)-4

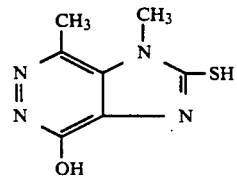

-continued (VI)-5

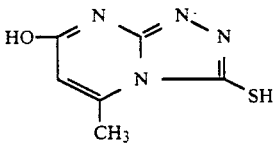

(VI)-6

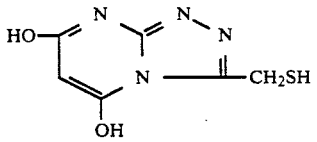

(VI)-7

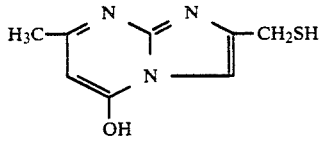

(VI)-8

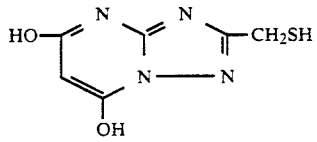

(VI)-9

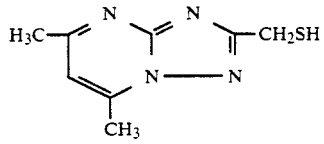

(VI)-10

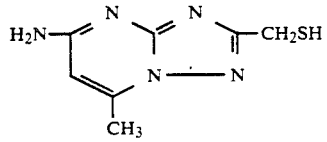

(VI)-11

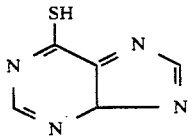

(VI)-12

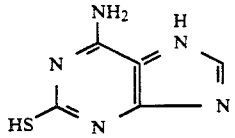

Regarding the heterocyclic compounds represented by the above formula (VI), they are disclosed in, for example, U.S. Pat. Nos. 2,743,181, 2,543,333, 2,566,659 and 2,956,876, and British Patent No. 701,054, etc.

Next, specific examples of the compounds represented by the formula (VII) will be shown below, but these are only examples of the present invention and the present invention is not limited to these.

(VII)-1

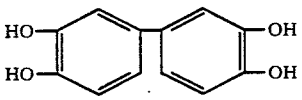

-continued (VII)-2

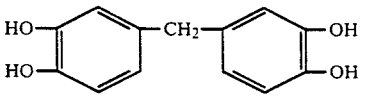

(VII)-3

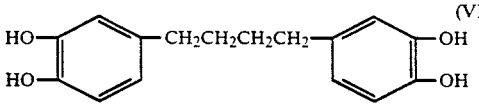

(VII)-4

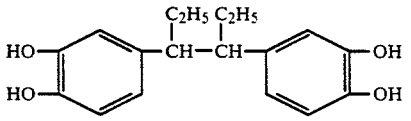

(VII)-5

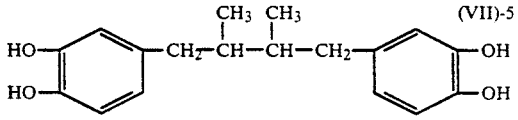

(VII)-6

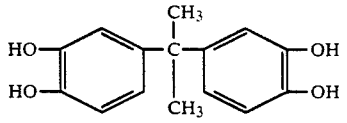

(VII)-7

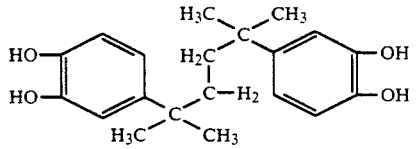

The method for preparing the bispyrocatechol to be used in the present invention is not uniform but is different from each other depending on the kinds of the compounds. The exemplary compounds 1 and 2 can be synthesized by using the method as described in Saburo Tamura and Kazuhiko Ohkuma (Journal of Nippon Agricultural Chemistry Association, vol. 27, pp. 877 to 881). The exemplary compound 3 was synthesized according to the method as described in Gisvolt Bureau Carlson (J. Am. Pharm. Assoc., vol 35, pp. 186 to 191), the exemplary compound 4 was Keiichi Shishido, Hitoshi Nozaki and Hiroshi Kuyama (J. Ary. Chem., vol. 14, pp. 1124, 9), the exemplary compound 6 was Ralph B. Tompson (U.S. Pat. No. 2,542,972, issued on Feb. 27, 1955), and the exemplary compound 7 was Wilson and Baker (J. Chem. Soc., pp. 1678 to 1681 (1934)), respectively.

Next, specific examples of the compounds represented by the above formula (VIII) to be used in the present invention are shown in the following Table 1. In order to show each exemplary compound, in the table, only each of substituents $R_{11}$, $R_{12}$, $R_{13}$ and $R_{14}$ in the above formula (VIII) is described.

(VIII)

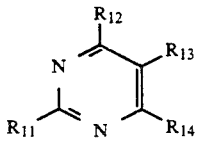

These only show examples of the present invention and the present invention is needless to say not limited by these.

TABLE 1

| Exemplary compound | $R_{11}$ | $R_{12}$ | $R_{13}$ | $R_{14}$ |
|---|---|---|---|---|
| 1 | SH | H | H | H |
| 2 | H | SH | H | H |
| 3 | SH | OH | H | H |
| 4 | SH | $NH_2$ | H | H |
| 5 | SH | H | Cl | H |
| 6 | SH | $NHNH_2$ | H | H |
| 7 | H | SH | $OCH_3$ | H |
| 8 | OH | SH | H | H |
| 9 | H | SH | H | $CH_3$ |
| 10 | H | SH | H | OH |
| 11 | SH | SH | H | H |
| 12 | H | SH | H | SH |
| 13 | $SC_2H_5$ | SH | H | H |
| 14 | SH | OH | H | 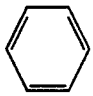 |
| 15 | SH | $NH_2$ | 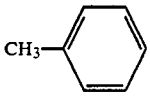 | H |
| 16 | SH | $CH_3$ | H | $NHNH_2$ |
| 17 | SH | $SC_2H_5$ | H | $CH_3$ |
| 18 | H | SH | $NH_2$ | $NHCH_3$ |
| 19 | $NH_2$ | SH | H | $CH_3$ |
| 20 | OH | SH | H | 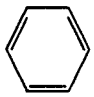 |
| 21 | OH | OH | SH | H |
| 22 | $NH_2$ | SH | H | SH |
| 23 | SH | SH | 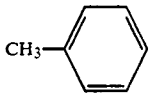 | H |
| 24 | H | SH | $NH_2$ | SH |
| 25 | $SC_2H_5$ | SH | $CH_3Cl$ | H |
| 26 | SH | SH | H | SH |
| 27 | SH | OH | Br | $NH_2$ |
| 28 | SH | OH | $C_2H_5$ | OH |
| 29 | SH | $NH_2$ | $NH_2$ | $NH_2$ |
| 30 | SH | OH | $CH_3OH$ | $CH_3$ |
| 31 | OH | SH | $CH_3$ | $CH_3$ |
| 32 | $NH_2$ | SH | $CH_3$ | 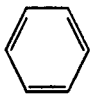 |
| 33 | $C_4H_9$ | SH | $NH_2$ | $NH_2$ |
| 34 | SH | SH | $NH_2$ | $CH_3$ |
| 35 | SH | SH | $C_2H_5$ | $CH_3$ |
| 36 | SH | SH | $NH_2$ | $NH_2$ |
| 37 | $SC_2H_5$ | SH | $CH_3$ | $CH_3$ |
| 38 | OH | H | SH | OH |

The mercaptpyridine compounds to be used in the present invention can be synthesized according to various methods. For example, they can be synthesized as disclosed in Japanese Patent Publication Open to Public Inspection (hereinafter referred to as Japanese Patent O.P.I. Publication) No. 1948/1975.

Amounts of the compounds of the above formulae (VI), (VII) and (VIII) to be used in the light-sensitive silver halide photographic material of the present invention may differ depending on the kinds of the silver halide emulsion, but they may be each in the range of $1\times10^{-6}$ to $1\times10^{-1}$ mole/mole Ag, more preferably $5\times10^{-5}$ to $1\times10^{-2}$ mole/mole Ag.

The silver halide to be used in the silver halide emulsion layer of the present invention may be any of silver chlorobromide, silver chloroiodobromide and silver iodobromide.

The particle size of the silver halide is not particularly limited, but those having an average particle size of smaller than 0.5 μm are preferred, and more preferably those so-called monodispersed grains in which 90% or more of the total grains belong within ±40% of the average particle size as the center.

Crystal habit of the silver halide grain may be any of cubic, tetradecahedral and octahedral, and also it may be a tablet type grain as disclosed in Japanese Patent O.P.I. Publication No. 108525/1983.

The method for preparing the silver halide grains of the silver halide emulsion layer of the present invention may be any of the single jet method such as normal precipitation method, reverse precipitation method, etc. or the double-jet method by the simultaneous precipitation method, but more preferably the simultaneous precipitation method. Also, any of the ammoniacal method, neutral method, acidic method, or the irregular ammonical method as disclosed in Japanese Patent Publication No. 3232/1983 may be employed and more preferably the acidic method or the neutral method.

Also, in these silver halide grains, a metal atom such as irridium, rhodium, osmium, bismuth, cobalt, nickel, ruthenium, iron, copper, zinc, lead, cadmium, etc. may be contained.

When these metal atoms are contained, they may be preferably contained in an amount in the range of $10^{-8}$ to $10^{-5}$ mole per one mole of silver halide. Also, the silver halide grain may preferably a surface latent image type one.

The silver halide photographic emulsion of the silver halide emulsion layer according to the present invention (hereinafter referred to "the silver halide photographic emulsion of the present invention") may be subjected to chemical sensitization. For chemical sensitization, there may be included sulfur sensitization, reduction sensitization and noble metal sensitization, but in the present invention, it is preferred to effect chemical sensitization only with sulfur sensitization. As the sulfur sensitizer, there may be employed, in addition to sulfur compounds contained in gelatin, various sulfur compounds such as thiosulfates, thioureas, thiazoles, rhodanines, etc. and more specifically the sulfur sensitizer as disclosed in U.S. Pat. Nos. 1,574,944, 2,410,689 and 2,728,668, and Japanese Patent Publication No. 11892/1984, etc. may be employed.

The silver halide photographic emulsion of the present invention may be provided sensitivity to desired light-sensitive wavelength region. Here, spectral sensitization may be carried out by using one or more sensitizing dyes. As the sensitizing dyes, various ones may be used but sensitizing dyes advantageously used in the present invention may include cyanines, carbocyanines, merocyanines, trinuclear or tetranuclear merocyanines, trinuclear or tetranuclear cyanines, styryls, holopolar cyanines, hemicyanines, oxonols, hemioxonols, etc. These spectral sensitizing dyes may preferably have, at a part thereof as a nitrogen-containing heterocyclic nucleus, a basic group such as thiazoline, thiazole, etc., or nucleus such as rhodanine, thiohidantoin, oxazolidindione, barbituric acid, thiobarbituric acid, pyrazolone, etc., and these groups may be substituted by alkyl, hydroxyalkyl halogen, phenyl, cyano, alkoxy, etc. These spectral sensitizing dyes may also be condensed with a carbon ring or a hetero ring.

In the silver halide photographic emulsion of the present invention, it may be added tetrazaindenes, etc. as a stabilizer, triazoles, tetrazoles, etc. an an antifoggant, oxanole dyes, dialkylaminobenzilidene dyes, etc. as a covering powder increasing agent or irradiation preventive, polymer latexes as a wetting agent, and other additives used for general photographic emulsion such as a spreading agent, a hardener other than the present invention for combination use, etc.

As a substrate of the light-sensitive silver halide photographic material of the present invention, there may be employed those generally used such as a polyester base, TAC base, baryta paper, laminated converted paper, glass plate, etc.

As a developing solution to be used in the light-sensitive silver halide photographic material of the present invention, any of the developing solutions which are used in usual light-sensitive silver halide photographic material and the lith developing solution may be employed. As the developing agent for the developing solution, there may be mentioned dihydroxybenzenes such as hydroquinone, chlorohydroquinone, catechol, etc., 3-pyrazolidones such as 1-phenyl-3-pyrazolidone, 1-phenyl-4,4-dimethyl-3-pyrazolidone, 1-phenyl-4-methyl-3-pyrazolidone, 1-phenyl-4-methyl-4-hydroxymethyl-3-pyrazolidone, etc., and further paraaminophenols such as N-methyl-p-aminophenol, N-(4-hydroxyphenyl)glycine, etc., p-phenylenediamines such as $\beta$-methanesulfonamide ester, ethylaminotoluidine, N,N-diethyl-p-phenylenediamine, etc., and ascorbic acids, etc. and the developing solution may be used as an aqueous solution containing at least one of the above developing agents.

In addition to the above, in the developing solution, there may be added a preservative such as sodium sulfite, potassium sulfite, formaldehyde, sodium hydrogen sulfite, hydroxylamine, ethylene urea, etc., a development inhibitor of inorganic salts such as sodium bromide, potassium bromide, potassium iodide, etc., at least one of organic inhibitor such as 1-phenyl-5-mercaptotetrazole, 5-nitrobenzimidazole, 5-nitrobenztriazole, 5-nitroindazole, 5-methyl-benzotriazole, 4-thiazolin-2-thione, etc., an alkaline agent such as sodium hydroxide, potassium hydroxide, an alkanol amine having a development accelerating effect such as diethanolamine, triethanolamine, 3-diethylamine-1-propanol, 2-methylamino-1-ethanol, 3-diethylamino-1,2-propanediol, diisopropylamine, 5-amino-1-pentanol, 6-amino-1-hexanol, etc., a buffering agent having a buffer effect in the developing solution such as sodium carbonate, sodium phosphate, carbonic acid aqueous solution, phosphoric acid aqueous solution, etc., a salt such as sodium sulfate, sodium acetate, sodium succinate, etc., a water softening agent by a chelating effect such as sodium ethylenediaminetetraacetate, sodium nitrilotriacetate, sodium hydroxydiaminetriacetate, etc., a development hardening agent such as glutaraldehyde, etc., a solvent for the developing agent or the organic inhibitor such as diethylene glycol, dimethylformaldehyde, ethyl alcohol, benzyl alcohol, etc., a development compensating agent such as methylimidazoline, methylimidazole, polyethylene glycol, dodecylpyridinium bromide, etc. to constitute the developing solution.

A pH of the developing solution is not particularly limited but it is preferably in the range of 9 to 13.

One preferred example to constitute the developing solution for developing the light-sensitive silver halide photographic material of the present invention is as shown below. That is, the developing solution which comprises 20 to 60 g/l of hydroquinone and 0.1 to 2 g/l of 1-phenyl-4-methyl-4-hydroxymethyl-3-pyrazolidone or 0.1 to 2 g/l of 1-phenyl-4,4-dimethyl-3-pyrazolidone as developing agents, 10 to 200 g/l of sodium sulfite or 10 to 200 g/l of potassium sulfite as a preservative for the developing solution, 1 to 10 g/l of sodium bromide or potassium bromide as a development inhibitor of an inorganic salt, 1 to 50 g/l of an alkanol amine having a development accelerating effect, 0.05 to 2 g/l of 5-methylbenzotriazole or 0.01 to 2 g/l of 5-nitroindazole as an organic inhibitor, 1 to 50 g/l of sodium carbonate or 10 to 800 ml/l of phosphate aqueous solution (1 mole/liter) as a buffering agent, 0.1 to 10 g/l of ethylenediaminetetraacetate disodium salt, and adjusted to its pH to 11.0 to 12.5 by using a suitable alkali agent (e.g. potassium hydroxide).

The light-sensitive silver halide photographic material of the present invention is developed with the above developing solution, and then through the processes of fixing, washing and drying to fix an image thereon. At this time, with regard to the temperature and time of the development, there is no specific limitation, but the development temperature may be preferably be 20° to 45° C. and the development time may preferably be 15 to 200 seconds.

EXAMPLES

In the following, the present invention will be explained in more detail, but the present invention is not limited thereby.

EXAMPLE 1

In a gelatin aqueous solution maintained at 40° C. were added a silver nitride aqueous solution and a halide aqueous solution (KBr 40 mole % and NaCl 60 mole %) simultaneously by the controlled double-jet method over 60 minutes while maintaining pH to 3.0 and pAg to 7.7 to prepare monodispersed silver chlorobromide emulsion having an average particle size of 0.30 μm. The emulsion was subjected to desalting and washing by the conventional manner, and then chemical ripening was carried out by adding 15 mg of sodium thiosulfate per one mole of silver chlorobromide at 60° C. for 60 minutes.

Subsequently, to the emulsion was added 1 g/l of 6-methyl-4-hydroxy-1,3,3a,7-tetrazaindene. The following compound (M) as the sensitizing dye (300 mg/one mole of Ag), 250 mg/one mole of Ag of polyethylene glycol having a molecular weight of about 4000, a hydrazide compound and the compound of the formula (II) according to the present invention were added as shown in Table 2. Further, $1\times10^{-3}$ mole/one mole of Ag of 5-nitroindazole, $5\times10^{-3}$ mole/one mole of Ag of hydroquinone, butylacrylate latex polymer and a saponine aqueous solution as spreading agent were added thereto to prepare an emulsion coating solution. Moreover, in the gelatin aqueous solution were added an aqueous sodium 1-decyl-2-(3-isopentyl)succinate-2-sulfonate solution as a spreading agent, a methyl methacrylate polymer having an average particle diameter of 3.0 μm as a matting agent and 2-hydroxy-4,6-dichloro-1,3,5-triazine sodium salt as a hardening agent to prepare a coating solution for a protective layer. This coating solution and the above emulsion coating solution were subjected to simultaneous multi-layer coating on a PET base followed by drying. At this time, provided amounts of gelatin were 2.5 g/m$^2$ for the emulsion layers and 1.0 g/m$^2$ for the protective layer, a provided amount of AgX grains was 3.5 g/m$^2$ in terms of Ag, a provided amount of the butylacrylate latex polymer was 2 g/m$^2$, a provided amount of the matting agent was 30 g/m$^2$, and a provided amount of a hardening agent was 2 g/100 g of gelatin per total amount of gelatin including both of the emulsion layer and the protective layer.

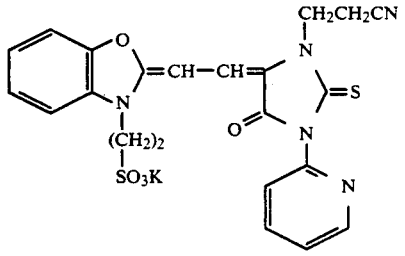

(M)

| (Composition B) | |
|---|---|
| Pure water (deionized water) | 17 ml |
| Sulfuric acid 50% w/v aqueous solution) | 4.7 g |
| Aluminum sulfate (an aqueous solution in which content thereof in terms of $Al_2O_3$ is 8.1% w/v) | 26.5 g |

At the time using a fixing solution, in 500 ml of water were dissolved the following composition A and the above composition B in this order to adjust to 1 liter for use. A pH of this fixing solution was adjusted to 6 with acetic acid.

It can be understood that the resulting sample can remarkably restrain generation of pepper fog without impairing sensitivity and contrast. In Table 2, sensitivity was shown as a relative sensitivity.

| <Prescription of the developing solution> | |
|---|---|
| Hydroquinone | 34 g |
| N-methyl-p-aminophenol | 0.23 g |
| Ethylenediaminetetraacetic acid disodium salt | 1 g |
| 3-Diethyl-1,2-propanediol | 15 g |
| 5-Methylbenztriazole | 0.4 g |
| $Na_2SO_3$ | 76 g |
| NaBr | 3 g |
| NaCl | 1.3 g |

-continued

| <Prescription of the developing solution> | |
|---|---|
| 1 Mole/liter phosphoric acid solution | 400 ml |

After addition of NaOH necessary for adjusting pH to 11.5, made up to one liter with water.

| <Prescription of the fixing solution> (Composition A) | |
|---|---|
| Ammonium thiosulfate (72.5% w/v aqueous solution) | 240 ml |
| Sodium sulfite | 17 g |
| Sodium acetate · trihydrate | 6.5 g |
| Boric acid | 6 g |
| Sodium succinate · dihydrate | 2 g |

By using the above samples No. 1 to No. 8, stepwise exposure was provided by using a tungsten light source through a film wedge in accordance with the conventional method, then development was carried out by the developing solution shown below at 38° C. for 30 seconds, followed by fixing, washing and drying, and then sensitivity, contrast and pepper fog of the samples were evaluated. Contrast was shown with gradation at the linear portion of the characteristic curve (tan $\theta$ value), and generation degree of pepper fog was ranked with four steps of (5) no generation, (4) one or two in a visual field, (3) a little but low quality and (2) remarkably generated. The results thus obtained are shown in the following Table 2.

TABLE 2

| Content | Sample No. | hydrazide derivative Compound No. | hydrazide derivative Added amount (mole/mole Ag) | Compound of the formula (II) Compound No. | Compound of the formula (II) Added amount (mole/mole Ag) | Sensitivity | Contrast | Pepper fog |
|---|---|---|---|---|---|---|---|---|
| Comparative | 1 | — | — | — | — | 50 | 8 | 5 |
| " | 2 | (a) | $2 \times 10^{-5}$ | (II)-1 | $3 \times 10^{-5}$ | 98 | 10 | 2 |
| " | 3 | (b) | " | (II)-1 | " | 100 | 15 | 2 |
| " | 4 | I-a-8 | " | — | — | 100 | 13 | 2 |
| This invention | 5 | I-a-8 | " | (II)-1 | $3 \times 10^{-5}$ | 120 | 17 | 5 |
| " | 6 | I-b-8 | " | (II)-8 | " | 125 | 18 | 5 |
| " | 7 | I-c-3 | " | (II)-8 | " | 140 | 17 | 4 |
| " | 8 | I-c-11 | " | (II)-10 | " | 135 | 17 | 5 |

Comparative compounds

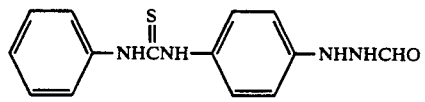

(a)

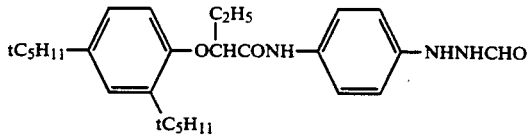

(b)

EXAMPLE 2

In the same manner as in Example 1, in a gelatin aqueous solution maintained at 40° C. were added a silver nitride aqueous solution and a halide aqueous solution (KBr 40 mole %) and NaCl 60 mole %) simultaneously by the controlled double-jet method over 60 minutes while maintaining pAg to 7.7 and pH to 3.0. This emulsion was subjected to desalting and washing according to the conventional method and then subjecting to redispersion by adding gelatin to prepare monodispersed silver chlorobromide emulsion Em - 1 having an average particle size of 0.30 μm. Subsequently, in the same manner as in Em - 1 except for adding $1\times10^{-6}$ mole/one mole of AgX of potassium hexachloroiridium (IV) acid which is in an aqueous iridium compound to a halide aqueous solution, was prepared monodispersed silver chlorobromide emulsion Em - 2 having an average particle size of 0.30 μm.

Subsequently, in the same manner as in Em - 1 except for adding $2.28\times10^{-7}$ mole/one mole of AgX of rhodium trichloride trihydrate which is an aqueous rhodium salt to a halide aqueous solution, was prepared monodispersed silver chlorobromide emulsion Em - 3 having an average particle size of 0.30 μm. Each emulsion of these Em - 1, 2 and 3 was subjected to the same operations as in Example 1 from chemical ripening to simultaneous multi-layer coating and drying to obtain Samples No. 9 to No. 14.

Thereafter, exposure, development and evaluation were carried out in the methods as in Example 1. Contents of the compounds of the present invention to be used in the experiments and the results of the evaluations are shown in Table 3.

TABLE 3

| Content | Sample No. | Emulsion | Hydrazide derivative Compound No. | Hydrazide derivative Added amount (mole/mole Ag) | Compound of the formula (II) Compound No. | Compound of the formula (II) Added amount (mole/mole Ag) | Sensitivity | Contrast | Pepper fog |
|---|---|---|---|---|---|---|---|---|---|
| This invention | 9 | Em-1 | I-b-8 | $2\times10^{-5}$ | (II)-1 | $3\times10^{-5}$ | 125 | 18 | 5 |
| Comparative | 10 | " | I-b-8 | " | — | — | 130 | 16 | 2 |
| This invention | 11 | Em-2 (iridium) | I-b-8 | " | (II)-1 | $3\times10^{-5}$ | 125 | 18 | 5 |
| Comparative | 12 | Em-2 (iridium) | I-b-8 | " | — | — | 130 | 17 | 2 |
| This invention | 13 | Em-3 (rhodium) | I-b-8 | " | (II)-1 | $3\times10^{-5}$ | 120 | 18 | 5 |
| Comparative | 14 | Em-3 (rhodium) | I-b-8 | " | — | — | 120 | 18 | 3 |

As clearly seen from Table 3, it can be confirmed that Samples No. 9, No. 11 and No. 13 in which the compound of the present invention is used show remarkable pepper fog inhibiting effect in the emulsion which is metal doped by using iridium and rhodium.

EXAMPLE 3

In the same manner as in Example 1, coating and drying were carried out except for using the compound (III) in place of the compound (II) to prepare Samples. Then, these samples were subjected to exposure treatment in the same manner as in Example 1 and then evaluated. Contents of the samples and the results of evaluation are shown in Table 4.

EXAMPLE 4

In the same manner as in Example 1, coating and drying were carried out except for using the compound (IV) in place of the compound (II) to prepare Samples. Then, these samples were subjected to exposure treatment in the same manner as in Example 1 and then evaluated. Contents of the samples and the results of evaluation are shown in Table 5.

EXAMPLE 5

In the same manner as in Example 1, coating and drying were carried out except for using the compound (V) in place of the compound (II) to prepare Samples. Then, these samples were subjected to exposure treatment in the same manner as in Example 1 and then evaluated. Contents of the samples and the results of evaluation are shown in Table 6.

TABLE 4

| Content | Sample No. | Hydrazide derivative Compound No. | Hydrazide derivative Added amount (mole/mole Ag) | Compound of the formula (III) Compound No. | Compound of the formula (III) Added amount (mole/mole Ag) | Sensitivity | Contrast | Pepper fog |
|---|---|---|---|---|---|---|---|---|
| Comparative | 15 | — | — | — | — | 50 | 8 | 5 |
| " | 16 | (a) | $2\times10^{-5}$ | (III)-5 | $3\times10^{-4}$ | 99 | 10 | 2 |
| " | 17 | (b) | " | (III)-5 | " | 102 | 15 | 2 |
| This invention | 18 | I-a-8 | $2\times10^{-5}$ | (III)-5 | $3\times10^{-4}$ | 120 | 17 | 5 |
| " | 19 | I-b-8 | " | (III)-8 | " | 140 | 18 | 4 |
| " | 20 | I-b-8 | " | (III)-19 | " | 135 | 17 | 5 |
| " | 21 | I-c-3 | " | (III)-19 | " | 150 | 17 | 4 |

TABLE 5

| Content | Sample No. | Hydrazide derivative Compound No. | Hydrazide derivative Added amount (mole/mole Ag) | Compound of the formula (IV) Compound No. | Compound of the formula (IV) Added amount (mole/mole Ag) | Sensitivity | Contrast | Pepper fog |
|---|---|---|---|---|---|---|---|---|
| Comparative | 22 | — | — | — | — | 50 | 8 | 5 |
| " | 23 | (a) | $2 \times 10^{-5}$ | (IV)-1 | $2 \times 10^{-5}$ | 95 | 10 | 2 |
| " | 24 | (b) | " | (IV)-1 | " | 98 | 13 | 2 |
| This invention | 25 | I-a-8 | $2 \times 10^{-5}$ | (IV)-1 | $2 \times 10^{-5}$ | 110 | 17 | 5 |
| " | 26 | I-a-8 | " | (IV)-5 | " | 115 | 18 | 5 |
| " | 27 | I-b-8 | " | (IV)-5 | " | 125 | 17 | 5 |
| " | 28 | I-c-3 | " | (IV)-5 | " | 130 | 17 | 4 |
| " | 29 | I-c-3 | " | (IV)-14 | " | 125 | 18 | 5 |

TABLE 6

| Content | Sample No. | Hydrazide derivative Compound No. | Hydrazide derivative Added amount (mole/mole Ag) | Compound of the formula (V) Compound No. | Compound of the formula (V) Added amount (mole/mole Ag) | Sensitivity | Contrast | Pepper fog |
|---|---|---|---|---|---|---|---|---|
| Comparative | 30 | — | — | — | — | 50 | 8 | 5 |
| " | 31 | (a) | $2 \times 10^{-5}$ | (V)-3 | $3 \times 10^{-4}$ | 98 | 12 | 2 |
| " | 32 | (b) | " | (V)-3 | " | 100 | 13 | 2 |
| This invention | 33 | I-a-7 | $2 \times 10^{-5}$ | (V)-3 | $3 \times 10^{-4}$ | 115 | 17 | 5 |
| " | 34 | I-b-8 | " | (V)-3 | " | 120 | 17 | 5 |
| " | 35 | I-c-3 | " | (V)-3 | " | 135 | 18 | 5 |
| " | 36 | I-c-3 | " | (V)-4 | " | 145 | 17 | 4 |
| " | 37 | I-c-11 | " | (V)-5 | " | 140 | 17 | 5 |

EXAMPLE 6

In a gelatin aqueous solution maintained at 40° C. were added a silver nitride aqueous solution and a halide aqueous solution (KBr 40 mole % and NaCl 60 mole %) simultaneously by the controlled double-jet method over 60 minutes while maintaining pH to 3.0 and pAg to 7.7 to prepare monodispersed silver chlorobromide emulsion having an average particle size of 0.25 μm. The emulsion was subjected to desalting and washing by the conventional manner, and then chemical ripening was carried out by adding 15 mg of sodium thiosulfate per one mole of silver chlorobromide at 60° C. for 60 minutes.

Subsequently, to the emulsion was added 6-methyl-4-hydroxy-1,3,3a,7-tetrazaindene and as the sensitizing dye, 150 mg/one mole of Ag of 1-(β-hydroxyethyl)-3-phenyl-5-[(3-↓-sulfopropyl-α-benzoxazoliridene)ethylidene]thiohydantoin was added to effect optical sensitization.

Then, a hydrazide compound represented by the formula (I) of the present invention and the compound of the formula (VI) were added as shown in Table 7. Further, 400 mg of sodium p-dodecylbenzenesulfonate, 3.5 g of saponin and 2 g of styrene-maleic acid copolymer were added thereto per one mole of Ag and the mixture was coated on a base so as to become the Ag amount of 4.0 g/m$^2$ and the gelatin amount of 2.0 g/m$^2$. At this time, a protective layer containing 30 mg/m$^2$ of sodium 1-decyl-2-(3-isopentyl)succinate-2-sulfonate as a spreading agent and 25 mg/m$^2$ of formalin as a hardening agent with 1.2 g/m$^2$ of gelatin was multi-layer coated to prepare Samples 38 to 55.

The resulting samples were exposed by using an optical wedge with use of a tungsten light source.

The above test samples were processed by using the developing solution with the following prescription and the commercially available fixing solution according to an automatic developer having a development tank volume of 40 liters.

TABLE 7

| Sample No. | Hydrazine compound of this invention Compound No. | Hydrazine compound of this invention Amount added [mole/mole of Ag] | Compound of the formula (VI) Compound No. | Compound of the formula (VI) Amount added [mole/mole of Ag] |
|---|---|---|---|---|
| 38 | — | — | — | — |
| 39 | (a) | $2 \times 10^{-5}$ | — | — |
| 40 | (b) | " | — | — |
| 41 | I-a-8 | " | — | — |
| 42 | I-b-5 | " | — | — |
| 43 | I-c-3 | " | — | — |
| 44 | I-c-11 | " | — | — |
| 45 | (a) | " | (VI)-1 | $3 \times 10^{-5}$ |
| 46 | (b) | " | (VI)-7 | " |
| 47 | I-a-8 | " | (VI)-2 | " |
| 48 | " | " | (VI)-7 | " |
| 49 | I-b-5 | " | (VI)-3 | " |
| 50 | " | " | (VI)-5 | " |
| 51 | I-c-3 | " | (VI)-2 | " |
| 52 | " | " | (VI)-6 | " |
| 53 | " | " | (VI)-7 | " |
| 54 | I-c-11 | " | (VI)-7 | " |
| 55 | " | " | (VI)-9 | " |

In the above table, the comparative compounds (a) and (b) added to the silver halide emulsion layer are the same with those as used in Example 1.

After the above samples were processed, sensitivity, sharpness at the leg portion of the characteristic curve and pepper fog were evaluated. The sensitivity was shown by a relative sensitivity obtained by a reverse value of the exposed dose necessary for forming 2.5 with an optical density. Also, sharpness at the leg portion was shown by the exposure range of from 0.1 to 0.5 of the optical density. This value shows that smaller value is preferred characteristic wherein sharpness at the leg portion is good. Generation degree of the pepper fog is employed as the same rating system in Example 1. These results are shown in Table 8.

| [Development processing conditions] | | |
|---|---|---|
| Step | Temperature (°C.) | Time (second) |
| Developing | 40 | 15 |
| Fixing | 35 | 10 |
| Washing | 30 | 10 |
| Drying | 50 | 10 |

<Prescription of the developing solution>

| | |
|---|---|
| (Composition A) | |
| Hydroquinone | 15 g |
| Ethylenediaminetetraacetate disodium salt | 2 g |
| 1-Phenyl-5-mercaptotetrazole | 30 mg |
| 5-Methylbeztriazole | 200 mg |
| Potassium sulfite (55% aqueous solution) | 100 ml |
| Potassium carbonate | 50 g |
| Potassium bromide | 2 g |
| (Composition B) | |
| Diethylene glycol | 50 g |
| Pure water | 3 ml |
| Ethylenediaminetetraacetate disodium salt | 25 mg |
| Acetic acid (90% solution) | 0.3 ml |
| 5-Nitroinazole | 110 mg |
| 1-Phenyl-3-pyrazolidone | 500 mg |

When using the developing solution, the above compositions A and B were successively dissolved in 500 ml of pure water in this order to make up to one liter for use.

TABLE 8

| Sample No. | Content of the sample | Sensitivity | Sharpness at leg portion | Pepper fog |
|---|---|---|---|---|
| 38 | Comparative | 40 | 0.35 | 5 |
| 39 | " | 98 | 0.07 | 2 |
| 40 | " | 100 | 0.08 | 2 |
| 41 | " | 120 | 0.04 | 2 |
| 42 | " | 145 | 0.03 | 2 |
| 43 | " | 135 | 0.04 | 3 |
| 44 | " | 130 | 0.04 | 2 |
| 45 | " | 95 | 0.07 | 2 |
| 46 | " | 100 | 0.08 | 3 |
| 47 | This invention | 120 | 0.04 | 4 |
| 48 | " | 120 | 0.04 | 5 |
| 49 | " | 145 | 0.03 | 5 |
| 50 | " | 135 | 0.04 | 5 |
| 51 | " | 120 | 0.04 | 4 |
| 52 | " | 125 | 0.03 | 5 |
| 53 | " | 135 | 0.04 | 5 |
| 54 | " | 130 | 0.04 | 5 |
| 55 | " | 120 | 0.04 | 5 |

As clearly seen from the results in Table 8, it can be understood that the samples obtained by the present invention remarkably inhibit generation of pepper fog without impairing sensitivity and contrast.

EXAMPLE 7

In the same manner as in Example 6, samples were obtained except for replacing the compound of the formula (VI) with the compound of the formula (VII) and then the samples were subjected to the developing processing and evaluated as in Example 6. Contents of the samples and the results are shown in Table 9.

TABLE 9

| Sample No. | Compound (I) | Compound (VII) | Relative sensitivity | Sharpness at leg portion | Pepper fog |
|---|---|---|---|---|---|
| 56 | — | — | 40 | 0.35 | 5 |
| 57 | (a) | (VII)-7 | 95 | 0.07 | 2 |
| 58 | (b) | " | 100 | 0.08 | 3 |

TABLE 9-continued

| Sample No. | Compound (I) | Compound (VII) | Relative sensitivity | Sharpness at leg portion | Pepper fog |
|---|---|---|---|---|---|
| 59 | I-a-8 | " | 120 | 0.04 | 5 |
| 60 | " | (VII)-3 | 115 | 0.03 | 5 |
| 61 | I-b-5 | (VII)-4 | 140 | 0.04 | 4 |
| 62 | " | (VII)-7 | 135 | 0.04 | 4 |
| 62 | I-c-3 | (VII)-2 | 135 | 0.04 | 5 |
| 64 | " | (VII)-7 | 130 | 0.03 | 5 |
| 65 | I-c-11 | " | 125 | 0.04 | 5 |

An added amount of the compound represented by the formula (I) is $2\times10^{-5}$ mole/one mole of Ag and that of the compound of the formula (VII) is $3\times10^{-5}$ mole/one mole of Ag.

As clearly seen from Table 9, it can be understood that the samples No. 59 to 65 using the compounds of the present invention have pepper fog inhibiting effect without impairing sensitivity and contrast as compared with the comparative samples No. 56 to 58.

EXAMPLE 8

In the same manner as in Example 6, samples were obtained except for replacing the compound of the formula (VI) with the compound of the formula (VIII) and then the samples were subjected to the developing processing and evaluated as in Example 6. Contents of the samples and the results are shown in Table 10.

TABLE 10

| Sample No. | Compound (I) | Compound (VIII) | Relative sensitivity | Sharpness at leg portion | Pepper fog |
|---|---|---|---|---|---|
| 66 | — | — | 40 | 0.35 | 5 |
| 67 | (a) | (VIII)-38 | 95 | 0.08 | 2 |
| 68 | (b) | " | 100 | 0.09 | 2 |
| 69 | I-a-8 | " | 120 | 0.04 | 5 |
| 70 | " | (VIII)-10 | 115 | 0.04 | 5 |
| 71 | I-b-5 | (VIII)-38 | 140 | 0.04 | 4 |
| 72 | " | (VIII)-20 | 135 | 0.04 | 5 |
| 72 | I-c-3 | (VIII)-30 | 135 | 0.04 | 5 |
| 74 | " | (VIII)-38 | 130 | 0.04 | 5 |
| 75 | I-c-11 | " | 125 | 0.04 | 5 |

An added amount of the compound represented by the formula (I) is $2\times10^{-5}$ mole/one mole of Ag and that of the compound of the formula (VIII) is $3\times10^{-5}$ mole/one mole of Ag.

As clearly seen from Table 10, it can be understood that the samples No. 69 to 75 using the compounds of the present invention have pepper fog inhibiting effect without impairing sensitivity and contrast as compared with the comparative samples No. 66 to 68.

According to formation of high contrast image due to the light-sensitive silver halide photographic material using the hydrazine compound of the present invention, generation of pepper fog can be inhibited without impairing high contrast.

In other words, according to the present invention, the light-sensitive silver halide photographic material which is extremely high contrast and inhibited in generation of pepper fog can be provided without impairing high contrast.

We claim:

1. A light-sensitive silver halide photographic material which comprises:

at least one layer of hydrophilic colloidal layer including a light-sensitive silver halide photographic emulsion layer on a support, said light-sensitive silver halide emulsion layer containing a hydrazine derivative wherein said hydrazine derivative is a compound represented by Formula I-a, I-b or I-c:

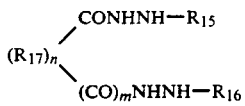

(I-a)

wherein $R_{15}$ and $R_{16}$ each represents an aryl group or a heterocyclic group, $R_{17}$ represents an organic bonding group, n is 0 to 6 and m is 0 or 1, provided that when n is 2 or more, each $R_{17}$ may be the same or different with each other;

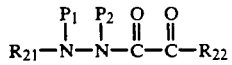

(I-b)

wherein $R_{21}$ represents an aliphatic group, an aromatic group or a heterocyclic group, $R_{22}$ represents a hydrogen atom, an alkoxy group, a heterocyclicoxy group, an amino group or an aryloxy group, each of which may be substituted or unsubstituted, $P_1$ and $P_2$ each represents a hydrogen atom, an acyl group or a sulfinic acid group; and

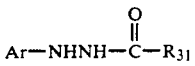

(I-c)

wherein Ar represents an aryl group containing at least one of a ballast group or a silver halide adsorption accelerating group, and $R_{31}$ represents a substituted alkyl group; and said hydrophilic colloidal layer contains at least one compound selected from the groups A and B consisting of:

Group A:

a compound represented by the Formula II, II-1, II-2, II-3, II-6 or II-8:

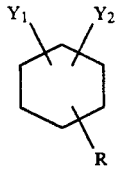

(II)

wherein $Y_1$ and $Y_2$ may be the same or different and each represents an —OH group or —$CH_2OH$ group; and R represents an alkyl group having 1 to 3 carbon atoms;

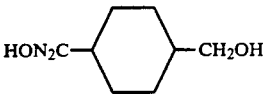

II-1

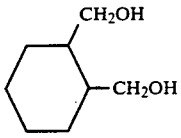

II-2

-continued

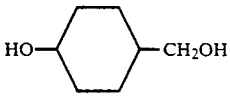

II-3

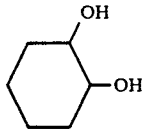

II-6

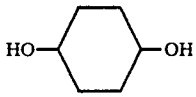

II-8 a compound represented by Formula III:

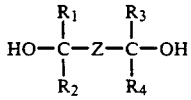

(III)

wherein $R_1$, $R_2$, $R_3$ and $R_4$ may be the same or different and each represents a hydrogen atom or a lower alkyl group, and Z represents —$(CH_2)_n$— where n represents 0 or an integer of 1 to 5,

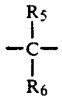

where $R_5$ and $R_6$ each represents a hydrogen atom, a methyl group, an ethyl group or an isopropyl group provided that the case where both of $R_5$ and $R_6$ are hydrogen atoms is excluded, —$CH_2$—O—$CH_2$—, —CH=CH—, —C≡C— or

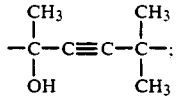

a compound represented by Formula IV:

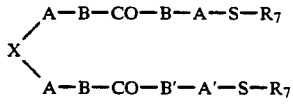

IV wherein A represents a lower alkylene group, —$(CH_2CH_2O)_p$—, —$(CH_2CH_2O)_p$—$CH_2$— or

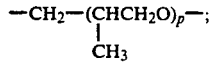

B represents a polyalkylene ether group which does not bond with O; A′ represents a lower alkylene group or a polyalkylene ether group represented by the formula: —$(CH_2CH_2O)_p$—$CH_2$—$CH_2$— or

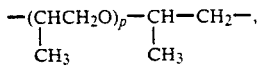

provided that A and A′ cannot be the polyalkylene ether groups at the same time, p represents 2 to 30, B and B′ each represents —NH— or —O—, but the case where both of B and B′ are —O—'s is excluded, $R_7$ represents a lower alkyl group, a phenyl group, an aralkyl group or $—CH_2)_qCOOR'$ where R′ represents a lower aralkyl group, q represents 1 to 3, and X represents a divalent group represented by —S—, —O—, $—CH_2—$,

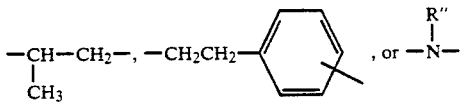

where R″ represents a lower alkyl group; and a compound represented by Formula V:

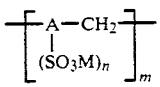

wherein A represents

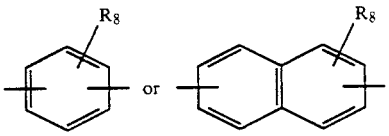

where $R_8$ represents a hydrogen atom or an alkyl group having 1 to 10 carbon atoms, n represents 1 or 2, and m represents an average degree of polymerization of an integer of 1 to 50, and M represents a hydrogen atom or an alkaline metal atom; and Group B:

a compound represented by Formula VII:

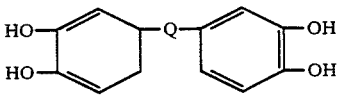

(VII)

wherein Q represents a substituted or unsubstituted straight aliphatic group having a carbon atom of 1 or more which bonds pyrocatechol of both sides, or may be formed a ring by bonding one end of an aliphatic group branched from the straight chain to one end of nucleus of pyrocatechol of both sides; and wherein said at least one compound selected from the groups A and B is contained in the photographic material in an amount of $1\times10^{-6}$ to $1\times10^{-1}$ mole per one mole of silver and said hydrazine derivative is contained in the photographic material in an amount of $5\times10^{-7}$ to $5\times10^{-1}$ mole per one mole of silver halide.

2. A light-sensitive silver halide photographic material according to claim 1, wherein said hydrazine derivative is contained in the photographic material in an amount of $5\times10^{-5}$ to $1\times10^{-2}$ mole per one mole of silver halide.

3. A light-sensitive silver halide photographic material according to claim 1, wherein said at least one compound selected from the groups A and B is contained in the photographic material in an amount of $5\times10^{-5}$ to $1\times10^{-2}$ mole per one mole of silver.

4. A light-sensitive silver halide photographic material according to claim 1, wherein the compound represented by the formula (III) is a compound of the formula:

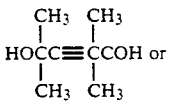

(III)-20

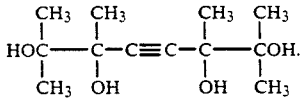

(III)-21

5. A light-sensitive silver halide photographic material according to claim 1, wherein the compound represented by the formula (IV) is a compound of the formula:

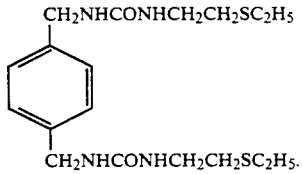

(IV)-12

6. A light-sensitive silver halide photographic material according to claim 1, wherein the compound represented by the formula (VII) is a compound of the formula:

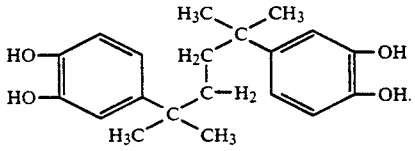

(VII)-7

* * * * *